United States Patent
Mathews et al.

(10) Patent No.: US 7,242,691 B2
(45) Date of Patent: Jul. 10, 2007

(54) OPTIMAL LOAD BALANCING ACROSS MULTIPLE SWITCHING FABRICS

(75) Inventors: Gregory S. Mathews, Santa Clara, CA (US); Eric Anderson, Palo Alto, CA (US); Philip Ferolito, Sunnyvale, CA (US); Mike Morrison, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 953 days.

(21) Appl. No.: 10/454,167

(22) Filed: Jun. 4, 2003

(65) Prior Publication Data

US 2003/0223438 A1 Dec. 4, 2003

Related U.S. Application Data

(60) Provisional application No. 60/385,998, filed on Jun. 4, 2002.

(51) Int. Cl.
*H01L 12/56* (2006.01)
*H01L 12/28* (2006.01)

(52) U.S. Cl. ...................................... 370/413; 370/412

(58) Field of Classification Search ................ 370/412, 370/413, 536
See application file for complete search history.

(56) References Cited

U.S. PATENT DOCUMENTS

| 7,106,736 | B2 * | 9/2006 | Kalkunte ..................... 370/391 |
| 7,139,271 | B1 * | 11/2006 | Parruck et al. ............. 370/392 |
| 2002/0089977 | A1 | 7/2002 | Chang |
| 2003/0058880 | A1 * | 3/2003 | Sarkinen et al. ............ 370/413 |

\* cited by examiner

*Primary Examiner*—Eliseo Ramos-Feliciano
*Assistant Examiner*—Wanda Z Russell

(57) ABSTRACT

A system for efficiently sending cells in-order to independent switching fabrics according to a serial high speed interface (HSI) protocol. The system includes redundancy in that fabrics may be removed by deleting the fabrics from striping and reassembly sequences. When fabrics are added, the fabrics are added to the striping and reassembly sequences. The system is efficient due in part to in-order transmission of cells serially across multiple fabrics. Full fabric bandwidth is thereby utilized without reordering overhead. Since packets are striped across all available fabrics, load is balanced across the fabrics.

20 Claims, 14 Drawing Sheets

OPTIMAL LOAD BALANCING ACROSS MULTIPLE SWITCHING FABRICS

CROSS REFERENCE TO RELATED APPLICATION

This application is entitled to the benefit of provisional Patent Application Ser. No. 60/385,998, filed 04 Jun. 2002.

FIELD OF THE INVENTION

The present invention relates generally to packet-based traffic forwarding, and more particularly to utilizing multiple switching fabrics in a packet-switched network node.

BACKGROUND OF THE INVENTION

Packet-switched networks are responsible for forwarding packet-based traffic. In some hardware devices, such as switches and routers, packets are broken into fixed-length cells and forwarded from an ingress, across a switching fabric, to an egress, where the cells are typically reassembled into packets.

In systems with multiple switching fabrics, cells may be forwarded from the ingress to the egress in parallel or serially. In a parallel configuration, cells associated with a packet are sent across a single fabric. Different packets may be sent simultaneously across different fabrics. In this configuration, an ordering protocol may be required to ensure that packets sent across different fabrics remain in proper order once received at the egress or possibly to ensure that packets that must be ordered relative to one another are sent serially across a single fabric. In a serial configuration, cells associated with a packet are sent across multiple fabrics. A packet in the process of being sent, i.e., a packet for which some but not all of its associated cells have been sent from the ingress to the egress, may be referred to as an in-flight or active packet. Packets that must be ordered relative to the in-flight packet must wait to be sent until the last cell of the in-flight packet is sent.

Ordering protocols typically entail a reordering overhead in both parallel and serial configurations. Systems with a substantial number of in-flight packets, ingress queues, and egress queues, often have additional ordering mechanisms such as identifiers (IDs), semaphores to indicate packets received/IDs available for reuse, storage elements to track current positions, available IDs, etc. Ordering mechanisms may also reduce system bandwidth by delaying out-of-order packets that have been transmitted across a fabric until in-order packets are received. This would typically appear as an idle period followed by bursts of traffic at the egress output. Idle periods represent lost bandwidth that typically cannot be recovered. Similarly, for a plurality of switching fabrics with cells arbitrarily sent through the switching fabrics to maximize bandwidth allocation, reordering mechanisms would be required to reassemble packets from the cells.

In view of the desire to minimize lost bandwidth in a system including a plurality of switching fabrics, what is needed is an, efficient packet-based traffic forwarding system that includes optimal load balancing across a plurality of switching fabrics. It would be advantageous to include redundancy by utilizing independent switching fabrics in the system.

SUMMARY OF THE INVENTION

A technique for efficiently striping packets across a plurality of switching fabrics involves efficiently sending partial packet data blocks, cells, in-order to independent switching fabrics. The advantages of utilizing this technique include redundancy, efficiency, and load balancing. Redundancy is achieved by utilizing a set of independent fabrics in the methodology set forth above. It is possible to add and remove fabrics without a loss of functionality by adding or deleting the fabrics from the striping and reassembly sequences. Fabric composite performance can be similarly scaled by the addition or removal of the independent fabric modules. In a system where the composite fabric bandwidth is greater than the maximum system bandwidth required, addition and removal of fabrics can be achieved without negatively impacting performance. In addition, because all working fabrics are used in the striping methodology, as opposed to using only the number of fabrics required to meet system bandwidth requirements, excess fabrics which supply redundancy are constantly tested through use, and provide additional fabric resources, buffering, or elasticity for bursts of traffic that temporarily exceed maximum sustainable bandwidth.

Efficiency is achieved because packets are transmitted from an ingress queue to a particular egress queue in-order. In addition, the egress maintains separate reassembly queues on a per ingress per priority basis. This allows the full fabric bandwidth to be utilized without packet reordering overhead. For example, if a set of four fabric links was used where packets were not striped (i.e., each packet was transferred across one link from start to finish), then four packets of arbitrary size being transferred from an ingress queue to the same egress queue, would either be restricted to a single fabric (performance loss), or would require an ordering indicator so the egress could place them back into the original order. For a system with a substantial number of packets in flight, ingress queues, and egress queues, the resources required would multiply (such resources include ordering IDs, semaphores to indicate packets received/IDs available for reuse, storage elements to track current positions, available IDs, etc.) Moreover, these ordering mechanisms can reduce system bandwidth as out-of-order packets that have already been transferred across the fabric wait for the first packet in order to be received. This would appear as IDLEs followed by bursts of traffic at the egress output, where IDLEs represent lost bandwidth that typically cannot be recovered. Similarly, for a set of four fabric links where cells of packets can be arbitrarily distributed among any fabric to maximize fabric bandwidth utilization, reordering mechanisms would be required to reassemble packets out of cells.

Load balancing is achieved since a particular packet will be striped across all available fabrics. Each fabric thereby gets an even share of packet traffic. Load balancing maximizes the availability of fabric buffers that can be used to compensate for bursty traffic and for incidents where multiple ingresses target the same egress.

In an embodiment, a method of load balancing across a plurality of switching fabrics includes targeting a first switching fabric with ingress queues, establishing the first switching fabric as an active fabric, selecting a first ingress queue to send a first cell to the active fabric if the first switching fabric is a starting fabric of the first ingress queue, sending the first cell if the first switching fabric is the starting fabric, incrementing the active fabric to a second switching fabric, and retargeting the target fabric of the first ingress queue if the first cell was sent.

In another embodiment, a method of load balancing across a plurality of switching fabrics includes maintaining packet reassembly queue sets (RQSs) per ingress per priority to a plurality of switching fabrics, initializing each RQS to a starting position, receiving a plurality of cells via the plurality of switching fabrics, associating one or more cells with a first row of a first RQS, associating each of the one or more cells with respective reassembly queues of the first RQS, and reassembling the one or cells into one or more packet segments as cells arrive from the switching fabrics.

In another embodiment, a system for performing load balancing across a plurality of switching fabrics includes an active fabric selector configured to identify a first fabric of a plurality of independent switching fabric modules as an active fabric, an ingress, coupled to each of the plurality of independent switching fabric modules via respective ingress high speed interfaces (HSIs), including a plurality of ingress queues, a plurality of target fabric selectors respectively associated with the plurality of ingress queues, wherein each target fabric selector is configured to identify one of the plurality of independent switching fabric modules, and a cell forwarding engine configured to select an ingress queue of the plurality of ingress queues in accordance with an arbitration algorithm if the ingress queue has an associated target fabric selector that identifies the active fabric, send a first cell from the selected ingress queue, adjust the active fabric selector in accordance with an active fabric incrementing algorithm such that the active fabric selector identifies a second fabric as the active fabric, and adjust the associated target fabric selector to identify the active fabric.

In another embodiment, a system for performing load balancing across a plurality of switching fabrics includes an egress, coupled to each of a plurality of independent switching fabric modules via respective egress HSIs, including a packet memory, a receive interface configured to receive cells from the independent switching fabric modules, reassembly queues configured to contain cells that are received in order from respective ingress queues, wherein the reassembly queues are logically divided into RQSs that contain one reassembly queue per switching fabric module per priority, a reassembly engine configured to associate a first subplurality of the cells that are received in order from a first respective ingress queue with a first row of a first RQS, associate the first subplurality of cells with respective reassembly queues of the first RQS, and reassemble the first subplurality of cells into one or more packet segments, in-progress buffers configured to contain the packet segments as packets are reassembled from received cells, packet queues configured to contain packets reassembled from the received cells, and a transmit interface configured to send packets from the packet queues.

Using the above-described techniques, optimal load balancing across a plurality of independent switching fabrics is accomplished.

Exemplary figures illustrate exemplary methods and systems for optimal load balancing across a plurality of switching fabrics. Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
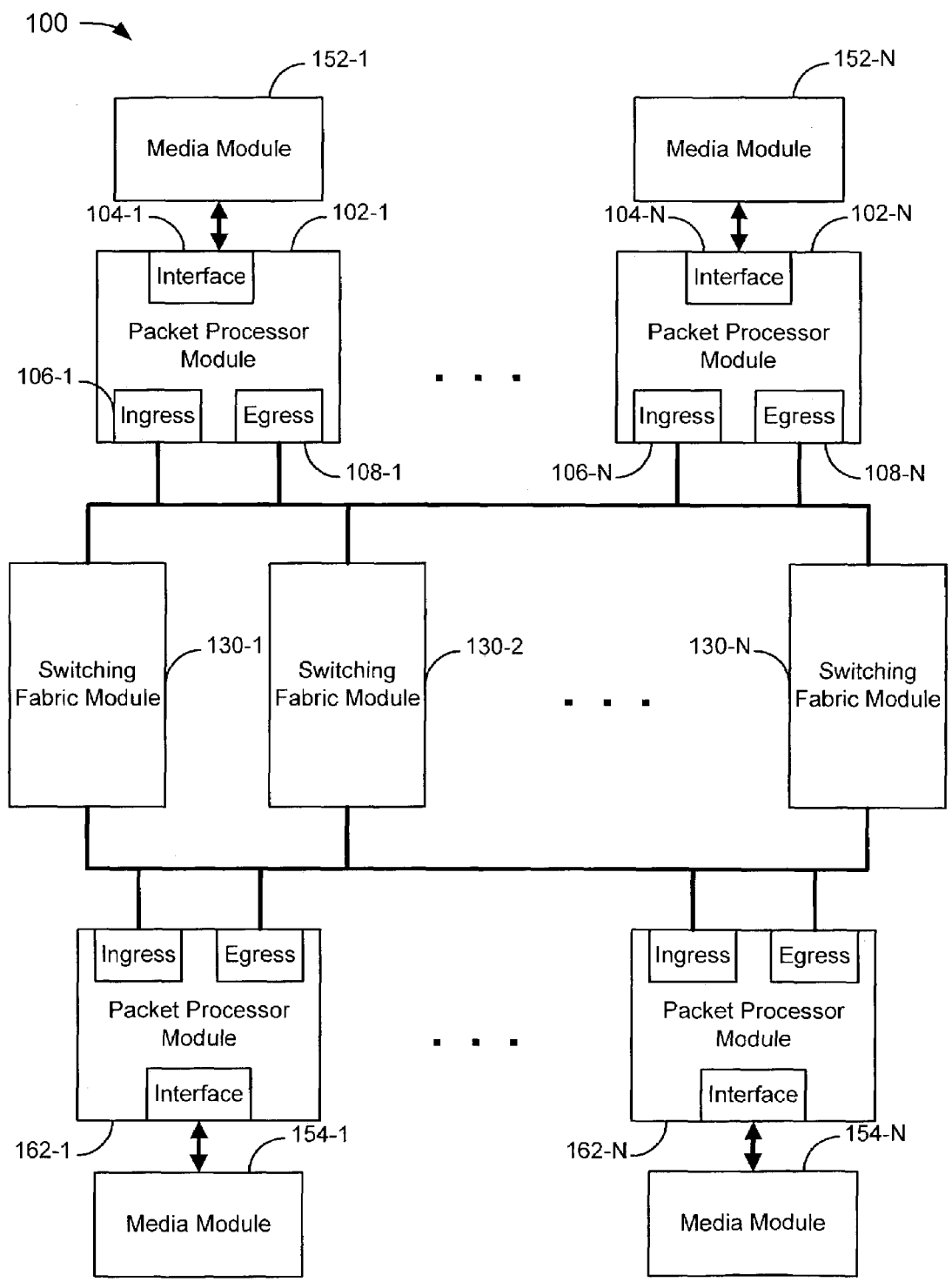
FIG. 1 is a block diagram of a traffic forwarding system in accordance with an embodiment of the invention.

As shown in the drawings for the purposes of illustration, an embodiment of the invention is a system for optimal load balancing across a plurality of switching fabrics.

FIG. 1 is a block diagram of a traffic forwarding system 100 in accordance with an embodiment of the invention. The system 100 includes media modules 152-1 to 152-N and 154-1 to 154-N, packet processor modules 102-1 to 102-N (referred to collectively as the packet processor modules 102) and 162-1 to 162-N (referred to collectively as the packet processor modules 162), and switching fabric modules 130-1 to 130-N (referred to collectively as the switching fabric modules 130). The media modules 152-1, 152-N, 154-1, and 154-N are respectively coupled to the packet processor modules 102-1, 102-N, 162-1, and 162-N. It should be noted that each packet processor module may be coupled to one or more media modules (not shown). The packet processor modules 102 and 162 are coupled to the switching fabric modules 130. The switching fabric modules 130 include circuitry to replicate cells by writing to multiple buffers. This functionality may be used with multicast cells that target a plurality of egress destinations. The packet processor module 102-1 includes an interface module 104-1 for forwarding packets to and from the media module 152-1, an ingress module 106-1 for forwarding cells to the switching fabric modules 130, and an egress module 108-1 for receiving cells from the switching fabric modules 130. The packet processor modules 102 and 162 have comparable components and couplings. In an embodiment, the interface modules 104 are configured to receive packets. If a packet is too large to fit in a single cell, it is broken into portions and each portion is encapsulated in a separate cell. In an embodiment, the system 100 is an Ethernet switch or an Ethernet router that forwards traffic within the system 100 using Layer 2, Layer 3, and/or Layer 4 header information. The system 100 may include line cards that support network protocols such as Ethernet, ATM, and Frame Relay. Although an Ethernet-based switch/router is described, the disclosed cell reassembly techniques can be applied to any system that has multiple switching fabrics.

Figure 2:
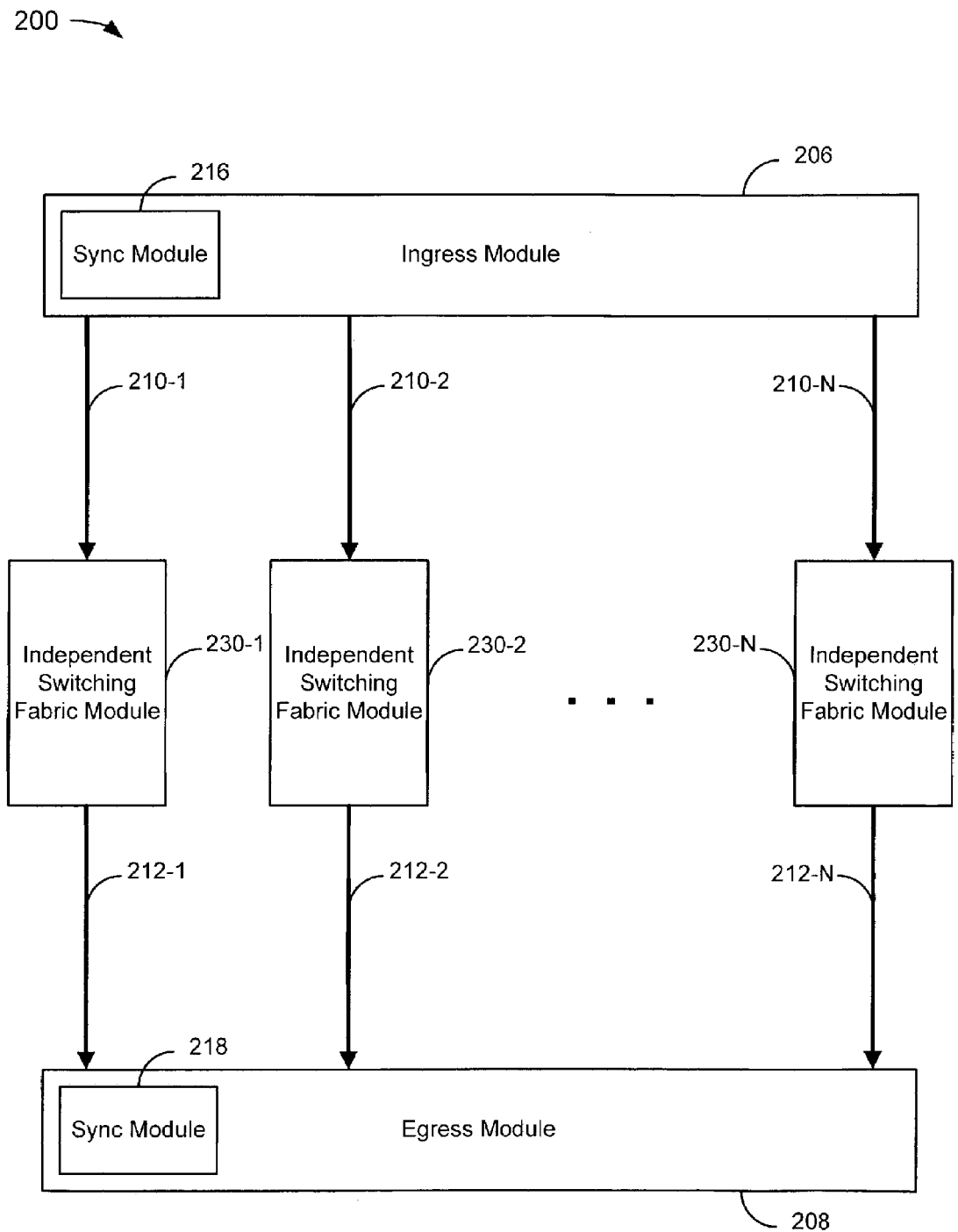
FIG. 2 is a block diagram of a traffic forwarding subsystem for use with the system of FIG. 1 in an embodiment of the invention.

FIG. 2 is a block diagram of a traffic forwarding subsystem 200 for use with the system 100 of FIG. 1 in an embodiment of the invention. The subsystem 200 includes an ingress module 206, independent switching fabric modules 230-1 to 230-N (referred to collectively as the independent switching fabric modules 230), and an egress module 208. The ingress module 206, which is an expanded view of the ingress module 106-1 (FIG. 1), includes a synchronization module 216. The egress module 208, which is an expanded view of the egress module 108-1 (FIG. 1), includes a synchronization module 218. FIG. 2 is intended to illustrate an embodiment of the invention wherein each of the independent switching fabric modules 230 is coupled to the ingress 206 by respective high speed interfaces (HSIs) 210-1 to 210-N. Similarly, each of the independent switching fabric modules 230 is coupled to the egress 208 by respective HSIs 212-1 to 212-N. The synchronization module 216 detects whether one or more of the independent switching fabric modules 230 are unavailable so that unavailable switching fabrics can be skipped when striping cells from the ingress module 206 across the independent switching fabrics 230. The synchronization module 216 may communicate this and other synchronization information to the egress module 208. The synchronization module 218 detects whether one or more of the independent switching fabric modules 230 are unavailable so that unavailable switching fabrics can be skipped when reassembling cells received across the independent switching fabrics 230. The synchronization modules 216 and 218 are designed to communicate such that packets may be reassembled from cells received across an unavailable switching fabric before it became unavailable and from cells received across available switching fabrics before and after an unavailable switching fabric became unavailable (and is skipped in the reassembly process). In an embodiment, the synchronization module 218 includes a fabric test block that receives hardware test cells. These test cells are configured to help keep the ingress 206 and egress 208 properly synchronized.

Figure 3A:
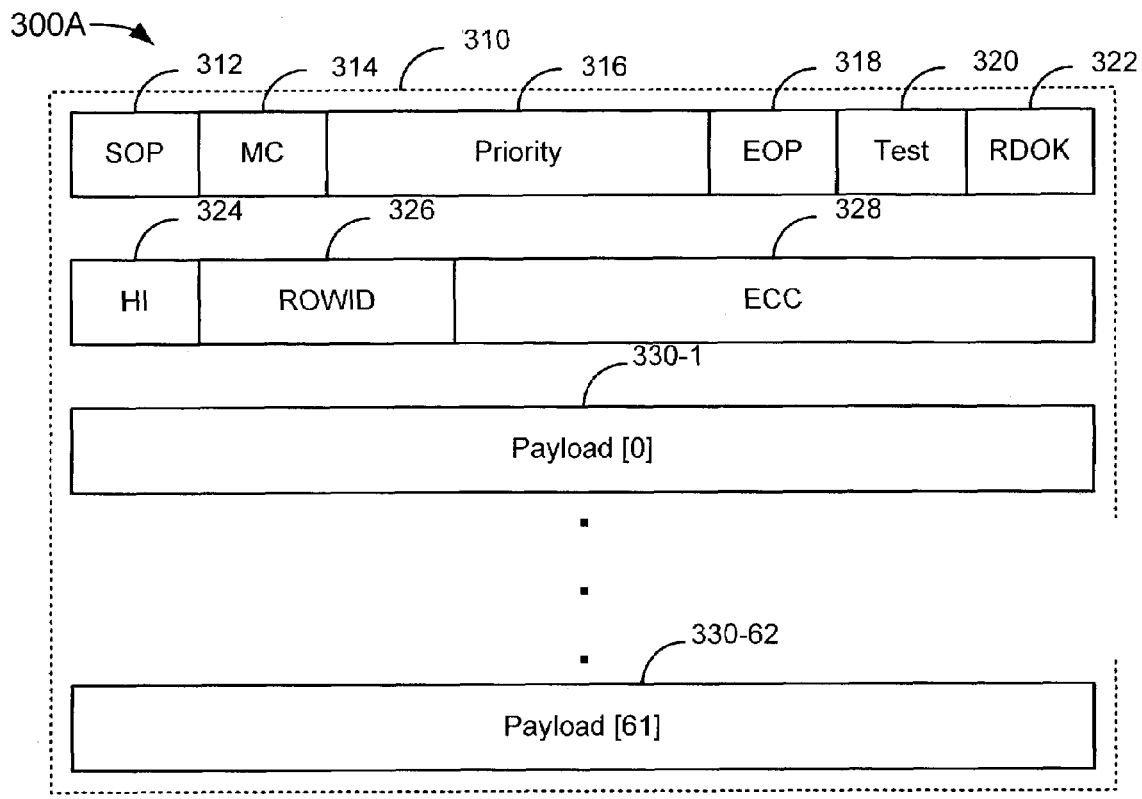
FIGS. 3A-3D are block diagrams of an exemplary cell and control information for use with the system of FIG. 1 in an embodiment of the invention.

FIG. 3A is a block diagram of an exemplary cell 300A for use with the system of FIG. 1 in an embodiment of the invention. The cell 300A includes a 64-byte cell portion 310. The 64-byte cell portion 310 includes a start-of-packet (SOP) flag 312, a multicast (MC) flag 314, a priority field 316, an end-of-packet (EOP) flag 318, a test flag 320, a read OK (RDOK) flag 322, a channel exit port (CEP) high (HI) flag 324, a row identifier (ROWID)/continuation field 326, an error check and correct (ECC) field 328, and a payload 330-1 to 330-62 (collectively referred to as the payload 330). The SOP flag 312 is set if a packet is broken into portions and the payload 330 of the cell 300A includes the first portion of the packet. A use for the SOP flag 312 is described with reference to FIGS. 7B and 8C, below. The MC flag 314 is set if the packet is multicast and not set if the packet is unicast. The priority field 316 contains the priority of the packet. In an embodiment, packets having different priorities are forwarded to, forward from, and reassembled in different queues, as described with reference to FIGS. 7-8, below. The EOP flag 318 is set if the payload 330 of the cell 300A includes the last portion of the packet. In an embodiment, the EOP flag 318 is optional. A use for the EOP flag 318 is described with reference to FIGS. 7B and 8C, below. The test flag 320 is set if the cell 300A is a hardware test packet. Hardware test packets may be used to determine whether switching fabrics are available, or for other purposes. The RDOK flag 322 is set by the ingress module 106-1 if the egress module 108-1 on the same packet processor module can accept cells (e.g., is not full) from the switching fabric modules 130. The RDOK flag 322 is set during normal operation. The HI flag 324 is used in conjunction with a CEP field, as described with reference to FIG. 3B, to identify a set of egress ports. In an embodiment, the ROWID/continuation field 326 is a 2-bit rotating row identifier that is compared to a 2-bit running counter (there is one per unicast egress reassembly queue) at the egress if the cell 300A is a unicast cell. The function of the ROWID/continuation field 326 is explained in more detail with reference to FIGS. 5 and 6 for unicast cells. The function of the ROWID/continuation field 326 is explained in more detail with reference to FIG. 3B for multicast cells. The ECC field 328 is used for error checking and correction. The payload 330 includes a packet or a portion of a packet.

Figure 3B:
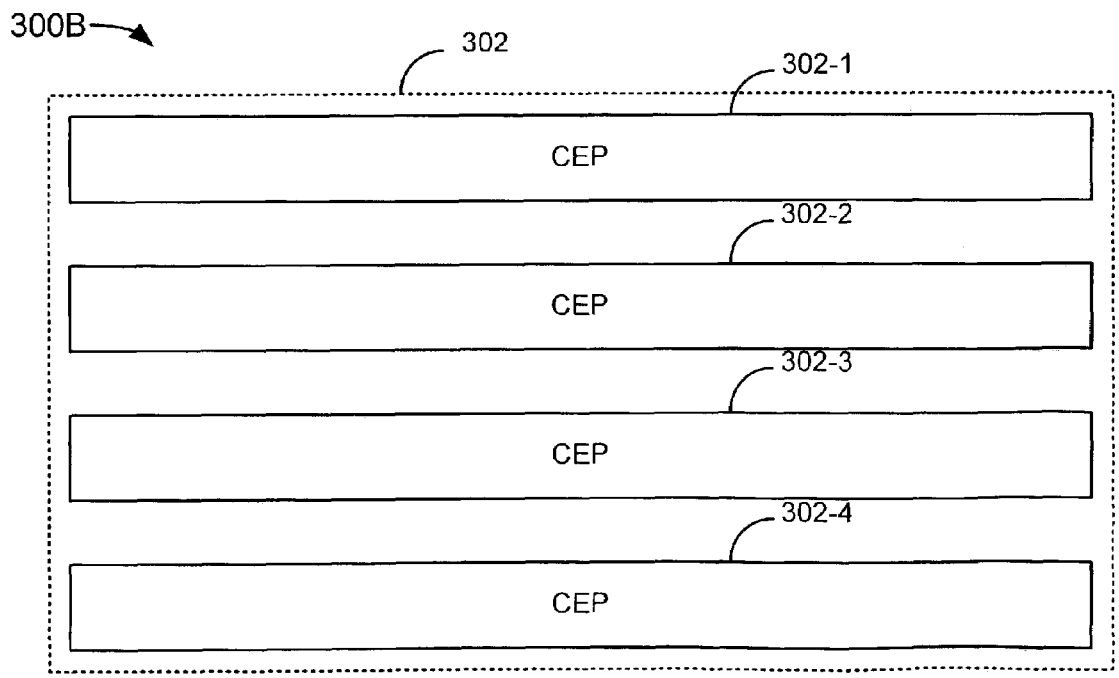

FIG. 3B is a block diagram of an exemplary ingress header 300B that may be associated with the cell 300A (FIG. 3A). The ingress header 300B includes a CEP field 302 with 4 bytes 302-1 to 304-4 of information. The ingress header 300B is associated with the exemplary cell 300A at an ingress prior to sending the exemplary cell 300A to the switching fabric modules 130 (FIG. 1). The CEP field 302 indicates one or more egress destinations of the cell to the switching fabric modules 130. The cell is replicated at the switching fabric modules if the cell has more than one egress destination such that the cell and each replicant have a single associated destination egress. The cell and each replicant are loaded into a buffer at a switching fabric module that corresponds to the single associated egress destination. Once the single associated egress destination has been determined, the CEP field 302 is no longer required and may be deleted or replaced with other control information such as the control information illustrated in FIG. 3C. It should be noted that the replicants are in fact cells and are hereinafter referred to simply as cells. In an embodiment, there are 64 egresses and the CEP field 302 includes 4 bytes of information, suitable for identifying up to 32 egresses (one bit per egress). If the HI flag 324 (FIG. 3A) is set, the up to 32 egresses identified by the CEP field 302 are the "high" egresses. If the HI flag 324 is not set, the up to 32 egresses identified by the CEP field 302 are the "low" egresses. Although in this embodiment some egresses are characterized as "high" and some egresses are characterized as "low", the characterization is not critical as long as the egresses are divided into two non-overlapping sets whose union yields the set of possible egresses and each set can be described with the CEP field 302. In an embodiment, the ingress may replicate the cell and send it to the switching fabric modules 130 multiple times so long as the CEP fields 302, and HI flags 324 provided for each replicant do not result in the cell being targeted to a given egress more than once. In another embodiment, if the cell 300A is a multicast cell, the ROWID/continuation field 326 contains a continuation bit. For example, the first bit of the ROWID/continuation field 326 may be set to '0' and the second bit of the ROWID/continuation field 326 (the continuation bit) set to '0' or '1' depending upon whether the next multicast cell is a continuation of the current multicast cell. In an embodiment, the continuation bit is set to '1' when the EOP flag 318 of the current multicast cell is set and the next multicast cell to be sent by the same ingress at the priority of the current multicast cell to the set of egresses targeted by the current multicast cell will be sent to the set of egresses targeted by the current multicast cell. A use for the continuation bit is discussed with reference to FIGS. 4, 7A, 7B, and 8A.

Figure 3C:
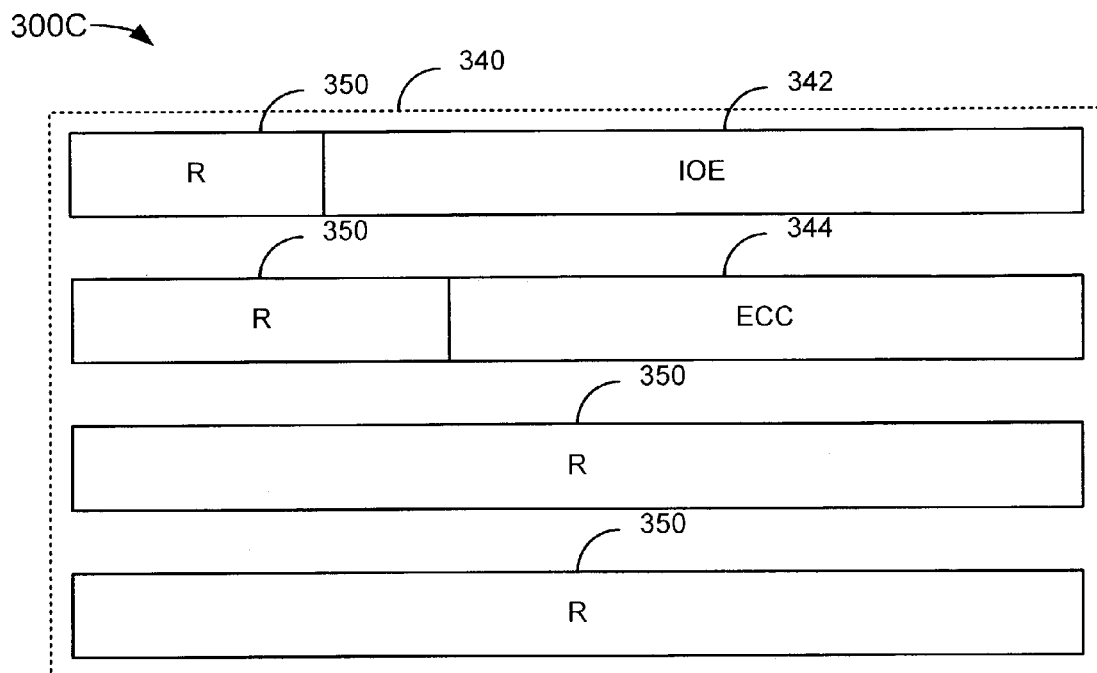

FIG. 3C is a block diagram of an exemplary egress header 300C that may be associated with the cell 300A (FIG. 3A). The egress header 300C includes a 4-byte egress control field 340. The egress control field 340 includes an ingress of entry (IOE) field 342, an ECC field 344, and reserved (R) fields 350. The IOE field 342 identifies the ingress from which the cell 300A was forwarded. A use for the IOE field 342 is provided with reference to FIG. 8C. The ECC field 344 is used for error checking and correction, but may be replaced at the egress with other control information, as described with reference to FIG. 3D. It should be noted that reference to a "cell" as used herein is generally a reference to the 64-byte cell portion 310.

Figure 3D:
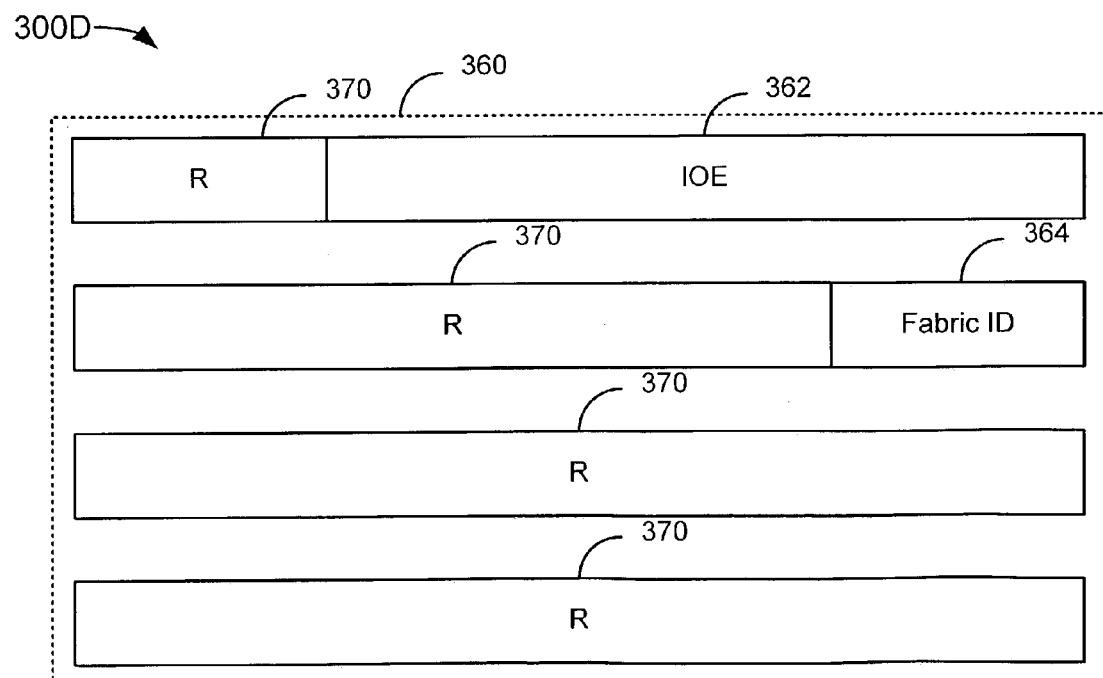

FIG. 3D is a block diagram of an exemplary egress header 300D that may be associated with the cell 300A (FIG. 3A). In an embodiment, after using the ECC field 344 for error checking and correction, the ECC field 344 is replaced with additional control information, including a fabric identifier (ID) 364. The fabric ID 364 identifies on which of the switching fabric modules 130 (FIG. 1) the cell associated with the fabric ID 364 was received at the egress. A use for the fabric ID 364 is described with reference to FIG. 8C.

Figure 4:
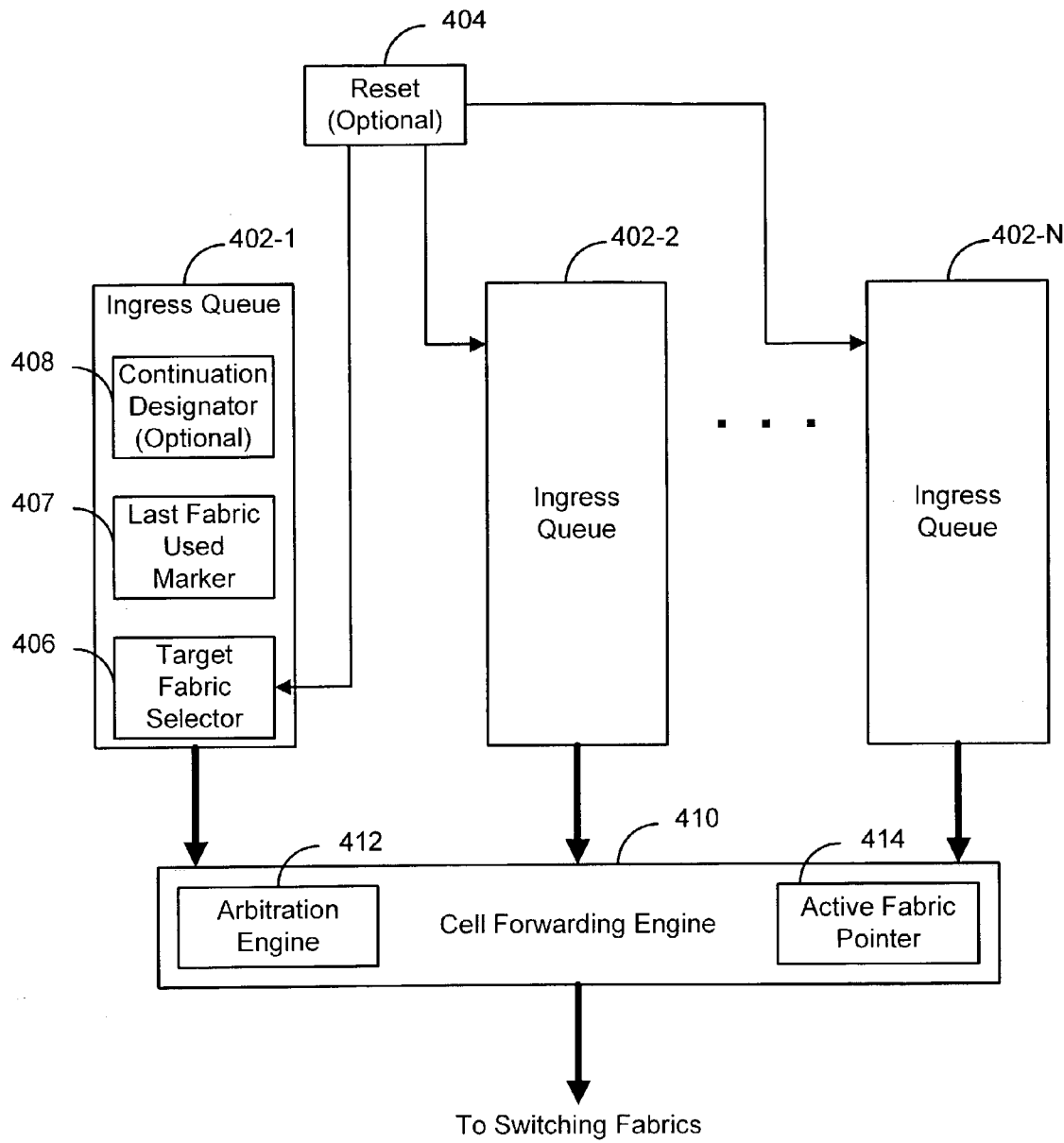
FIG. 4 is a block diagram of an ingress subsystem for use with the system of FIG. 1 in an embodiment of the invention.

FIG. 4 is a block diagram of an ingress subsystem 400 for use with the system 100 of FIG. 1 in an embodiment of the invention. In an embodiment, the subsystem 400 is analogous to the ingress module 206. The subsystem 400 includes ingress queues 402-1 to 402-N (referred to collectively as ingress queues 402), an optional reset field 404, and a cell forwarding engine 410. The ingress queue 402-1 includes a target fabric selector 406 and an optional continuation designator 408. In an embodiment, the ingress queues 402-2 to 402-N have comparable components (not shown). The cell forwarding engine 410 includes an arbitration engine 412 and an active fabric pointer 414. In an embodiment, the reset field 404 and target fabric selector 406 are logical data structures. The reset field 404 may contain a reset value for the target fabric selector 406. The use of the reset field 404 and target fabric selector 406 is somewhat different depending upon whether the ingress queue 402-1 is unicast or multicast. In an embodiment, the reset field 404 is programmed only once when the ingress is operationally installed. Thus, the value in the reset field 404 is a fixed, programmable starting fabric value. Multicast target fabric selectors are typically reset to the value in the reset field 404 after a packet has been sent. Also, the starting fabric is a fabric that is initially targeted by ingress queues 402 associated with the reset field 404 (e.g., when the ingress queues come on-line). To improve load balancing across the switching fabrics, the respective ingress reset fields could be programmed such that approximately the same number of ingresses have reset fields associated with each switching fabric. Unicast target fabric selectors vary over time and are typically not reset after sending a packet. Accordingly, unicast target fabric selectors may be initialized to zero and incremented over time, without reset following sending a packet. It should be noted that a continuation bit prevents reset for multicast target fabric selectors. The continuation designator 408 sets a continuation bit if an EOP flag 318 (FIG. 3A) of a first multicast cell is set and the priority and set of egress destinations of the cell is identical to the priority and set of egress destinations of a next multicast cell. If this technique is used properly, multicast target fabric selectors are not reset if a next cell has the same egress destinations as the last cell of a preceding packet, thereby improving bandwidth utilization. However, to avoid issues where a single multicast flow dominates traffic sent to the switching fabrics to the exclusion of other flows with overlapping egress targets (cells from different ingress queues cannot be interspersed if they have overlapping egress targets at the same priority except at packet boundaries), the multicast continuation bit may not be set if a minimum number of cells have been sent from a given ingress queue or if no cell follows the EOP cell in an ingress queue. The ingress queues 402 are configured to contain cells and contend with one another to forward the cells. The order of forwarding is determined by the arbitration engine 412 that implements an arbitration algorithm in accordance with the target fabric selector 406 of a contending ingress queue 402, the active fabric pointer 408, and other considerations, as described below with reference to FIG. 8A. A cell that wins arbitration at the cell forwarding engine 410 is forwarded to the active switching fabric module (e.g., an independent switching fabric module 230), using the active fabric pointer 414.

Each time a cell is sent from an ingress queue 402 to an active switching module, the last fabric used marker 407 is updated with the active fabric pointer 414 value. In the event that a switching fabric changes status from available to unavailable or from unavailable to available, then the target fabric selector 406 of the unicast ingress queues, and those multicast ingress queues that last sent a cell that was not an EOP cell with its continuation bit cleared, are retargeted to the first available fabric after the one specified in their last fabric used marker 407. The target fabric selector 406 of a multicast queue that last sent an EOP cell with its continuation bit cleared, is retargeted to the multicast starting fabric (if it is available) or the first available fabric after the multicast starting fabric (if the multicast starting fabric is not available). In this way, plus the sequencing of cell striping described later with reference to FIG. 8B, plus the sequencing of packet reassembly described later with reference to FIG. 8C, striping of cells across switching fabrics can continue even as fabrics become available/unavailable. Although it is to be noted that before the ingress can send cells across the switching fabrics to the egress with fabrics added (newly available) or removed (newly unavailable) from the striping pattern, the egress must be made aware of the new pattern (available columns) and when to begin using the new pattern relative to the cells it has/will receive.

Figure 5:
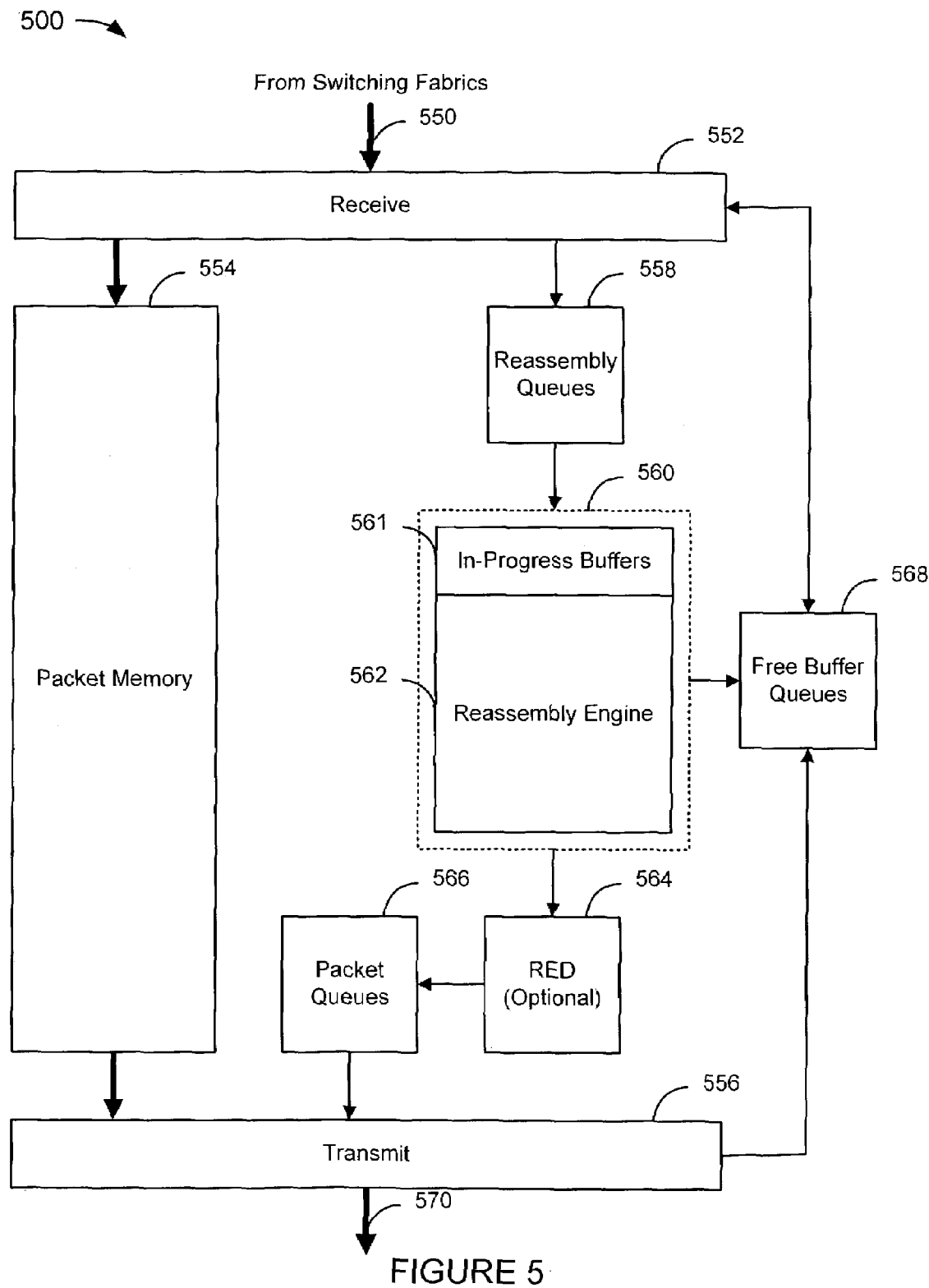
FIG. 5 is a block diagram of an egress subsystem for use with the system of FIG. 1 in an embodiment of the invention.

FIG. 5 is a block diagram of an egress subsystem 500 for use with the system of FIG. 1 in an embodiment of the invention. In an embodiment, the subsystem 500 is analogous to the egress module 208 of FIG. 2. The subsystem 500 includes a receive module 552, a packet memory 554, a transmit module 556, reassembly queues 558, a packet constructor 560, an optional random early discard (RED) block 564, packet queues 566, and free buffer queues 568. The packet constructor 560 includes in-progress buffers 561 and a reassembly engine 562. Cells are received on HSIs 550 at the receive module 552. HSIs 550 include one HSI per fabric module through which cells are forwarded (see, e.g., FIG. 2). In an embodiment, the receive module 552 includes a simple streaming buffer. The cells are stored in the packet memory 554. In an embodiment, the cells are written to the packet memory 554 once upon arrival from the HSIs 550 and read once when transmitted on interface 570 from the transmit module 556. Except for writes by the receive module 552 and reads by the transmit module 556, operations on cells or packets are actually on the pointers to the corresponding cells or packets. This representation of cells by pointers may be referred to as token assignment since the relatively large cell is represented by a smaller token (pointer) while the cell is stored in the egress module 208. In an embodiment, the cells of a packet are maintained with a doubly-linked list with each node having a link to the next cell of the same packet and a link to the next packet in the same queue. Though there are various queues, the queues are maintained as doubly-linked lists to maintain consistency. However, this is not critical.

A portion of the packet memory 554 is occupied by packets being reassembled, with the actual maximum amount of memory depending upon the depth of the reassembly queues 558. Though cells are forwarded from an ingress in order, when the cells arrive at the receive module 552, they may be out of order. When a cell arrives at the receive module 552, it is directed to a reassembly queue of the reassembly queues 558 to await the arrival of more cells from the ingress at that priority. The egress includes a reassembly queue for cells from each ingress of each priority received via each fabric, for a total of up to 2048 (8 priorities*64 ingresses*4 fabrics) reassembly queues 558 in an embodiment. Since packets are assembled from a unique ingress-priority source, it comes natural to divide the number of reassembly queues 558 by the number of fabrics to determine a number of reassembly queue sets (RQSs), yielding 512 RQSs in the embodiment just described. Accordingly, using the RQSs, reassembly is performed on a per-ingress per-priority basis. The RQSs are discussed in more detail below with reference to FIG. 6.

As the reassembly queues 558 enqueue cells, the cells are dequeued and moved to the in-progress buffer 561 of the packet constructor 560 for reassembly by the reassembly engine 562. When a packet is reassembled from each of its component cells, it is either dropped at the RED block 564, if applicable, or enqueued in the packet queues 566 for transmission by the transmit module 556. The RED block 564 is an optional mechanism for managing traffic congestion. In an embodiment, there are as many packet queues as the number of priorities multiplied by the number of destinations. Accordingly, if the transmit module 556 transmits a packet to one of five destinations, there are 40 packet queues 566 (8 priorities*5 destinations). The free buffer queues 568 supply pointers (to available space in packet memory 554) when buffer space is needed by the receive module 552 and in-progress buffers 562. As pointers (and the packet memory 554 space they represent) are made available, for example, after cells/packets are removed from the packet memory 554 and sent out by the transmit module 556, they are added to the free buffer queue 568.

In an embodiment, each cell is 64 bytes. Accordingly, if there are 2048 reassembly queues 558, each with a depth of 128 entries, the portion of the packet memory 554 that corresponds to the reassembly queues 558 is 16 MB (2048 queues*128 entries/queue*64 bytes/entry=16 MB). In order to prevent the reassembly process from being aborted due to insufficient buffers, a hard limit could be enforced. In an embodiment, this is accomplished by setting a global check in the RED block 564.

Figure 6:
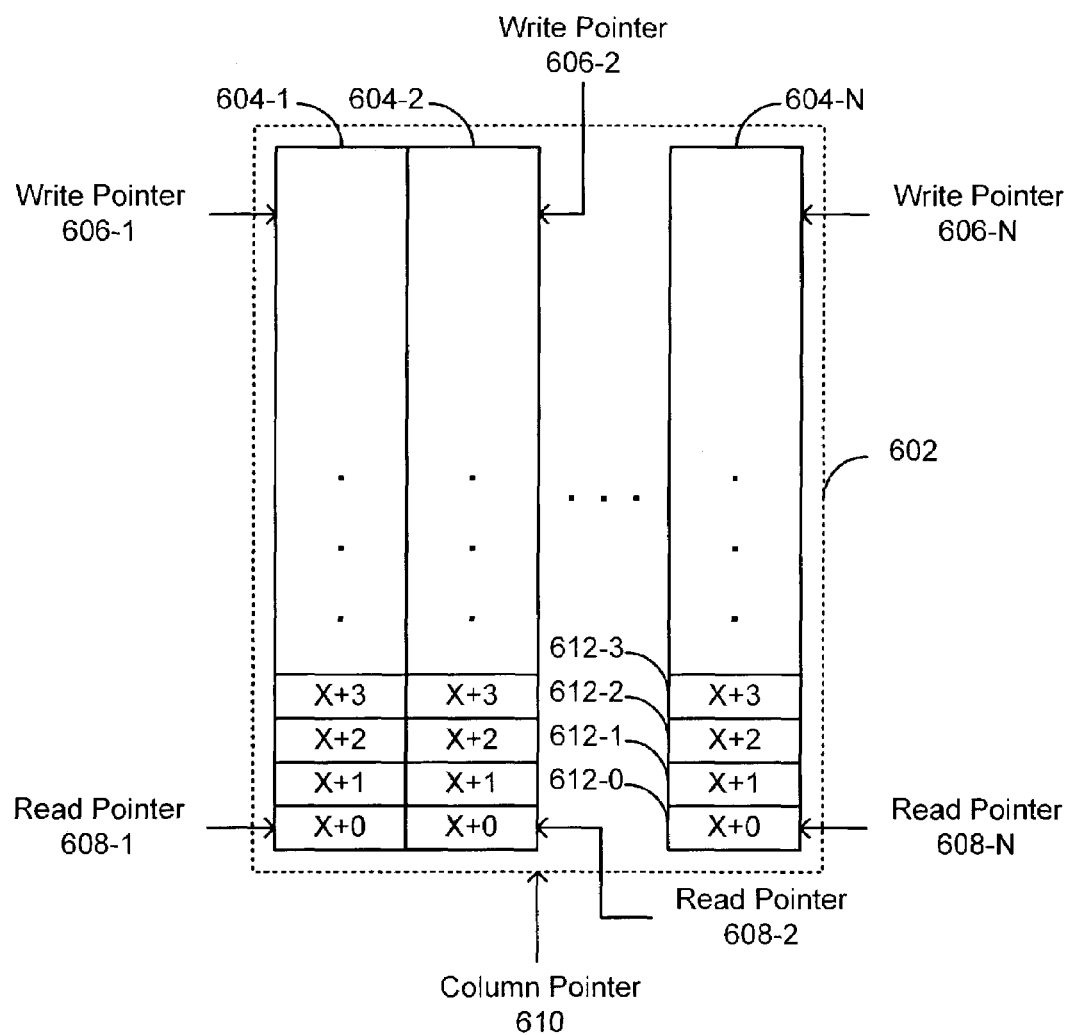
FIG. 6 is a block diagram of a reassembly queue set (RQS) for use with the system of FIG. 1 in an embodiment of the invention.

FIG. 6 is a block diagram of a RQS subsystem 600 for use with the system 100 (FIG. 1) in an embodiment of the invention. The subsystem 600 includes a RQS 602 and a plurality of pointers 606-610. The RQS 602 includes reassembly queues 604-1 to 604-N (collectively referred to as reassembly queues 604). The plurality of pointers 606-610 includes write pointers 606-1 to 606-N (collectively referred to as write pointers 606), read pointers 608-1 to 608-N (collectively referred to as read pointers 608), and a column pointer 610. The write pointers 606 point to the tails of their respective reassembly queues 604. When a cell is enqueued in a reassembly queue, it is at the tail of the reassembly queue in accordance with its write pointer. The read pointers 608 point to the heads of their respective reassembly queues 604. When a cell is dequeued from a reassembly queue, it is from the head of the reassembly queue in accordance with its read pointer. The column pointer 610 points to the reassembly queue that is to be dequeued next. In an embodiment, the column pointer 610 sweeps across the reassembly queue heads. For the purposes of illustration, it is assumed the column pointer 610 sweeps across the reassembly queue heads from left to right. If a cell is enqueued at position X+0 in the reassembly queue 604-1, then when the column pointer 610 points to the reassembly queue 604-1, the cell is dequeued, the read pointer 608-1 is incremented to position X+1 and the column pointer 610 is incremented to the reassembly queue 604-2. If a cell is enqueued at position X+0 of the reassembly queue 604-2, then when the cell is dequeued, the read pointer 608-2 is incremented to position X+1, and the column pointer 610 would be incremented to the next reassembly queue 604. Eventually, the column pointer 610 points to the last reassembly queue 604-N at position X+0. If a cell is enqueued at position X+0, and the cell is dequeued, the read pointer 608-N is incremented to position X+1, and the column pointer 610 is incremented back to the first reassembly queue 604-1. It should be noted that in an alternative embodiment, there are no read pointers 608 and the column pointer 610 is used to both indicate the next reassembly queue from which a cell is to be dequeued and to serve as a read pointer.

The RQS 602 may occasionally receive out of order cells in a reassembly queue 604-N. If the RQS 602 is a unicast RQS, then a ROWID 326 (FIG. 3A) associated with a cell may be used to determine that the cell is received out of order and the appropriate measures may be taken, such as flushing the reassembly queue 604-N. In an embodiment, the ROWID 326 is 2 bits long. The 2 bits of the ROWID 326 correspond to the least significant bits of a memory location in which the cell is to be stored. For example, memory locations 612-0 to 612-3 represent 4 contiguous memory locations with least significant bits of 0, 1, 2, and 3, respectively. An ingress is synchronized with the RQS 602 such that a cell should have a ROWID 326 that corresponds to the least significant bits of the memory locations 612-0 to 612-3. Accordingly, if a cell with a ROWID 326 having a value of 0 is located at position 612-0, the cell was probably received in order. In another embodiment, a 2-bit counter is maintained that is incremented each time the column pointer 610 wraps around from column 604-N to 604-1 (indicating a complete row has been read/dequeued from the RQS 602). Accordingly, if a cell with a ROWID 326 is scheduled for dequeuing and ROWID 326 does not match the 2-bit counter, then a cell ordering error has occurred. In an alternative, the 2-bit counter is initialized to match the starting ROWIDs before traffic is passed. It should be noted that if a cell was received 4 locations out of order, the ROWID 326 could actually appear to be in the correct memory location. However, errors of this magnitude are rare in at least the present embodiment. Of course, if the error were sufficiently likely, the ROWID 326 could be made 3 or more bits long. It should further be noted that this technique is difficult to implement with multicast cells, since synchronizing an ingress to multiple egresses becomes complex when multicasting a cell. For example, the ROWID 326 could very well be different for each destination. For this reason, in an embodiment, multicast error correction does not use the ROWID 326.

Figure 7A:
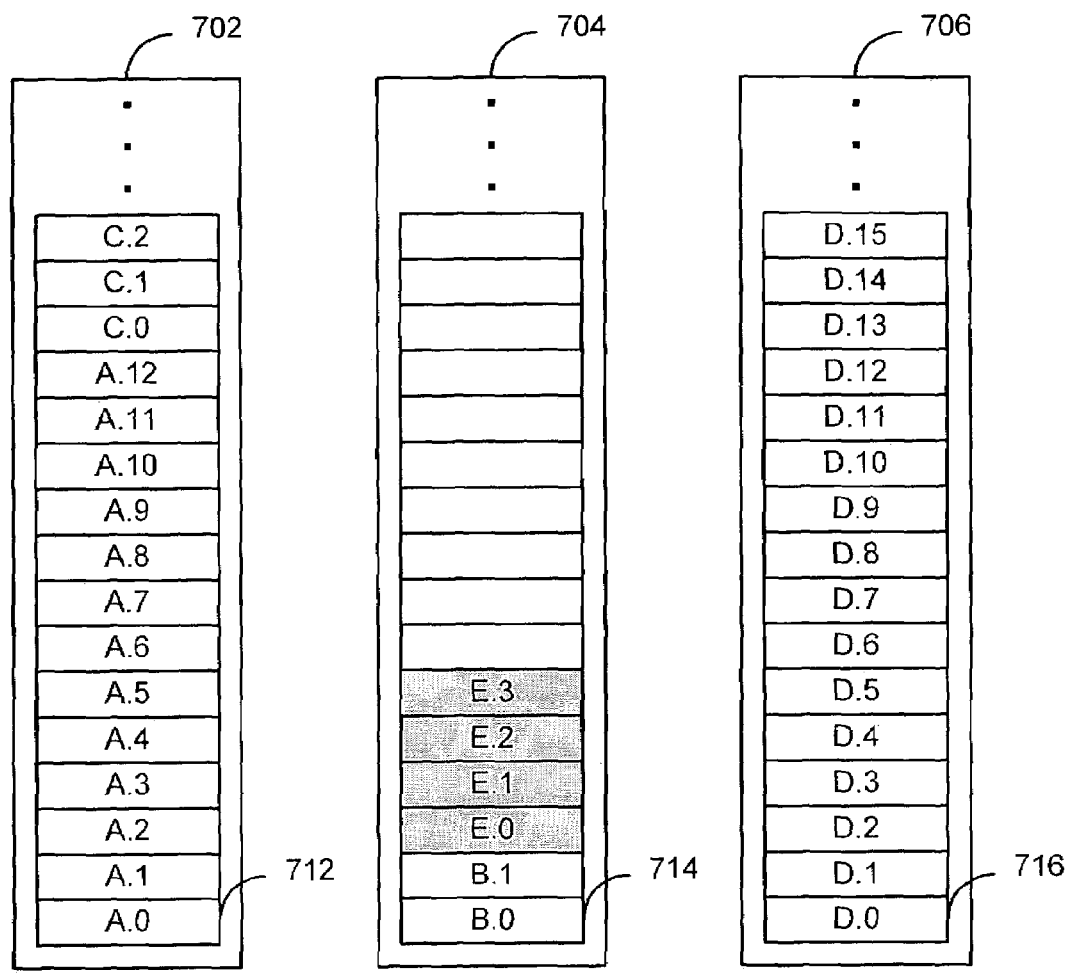
FIGS. 7A-7C are block diagrams of exemplary queues for use with the system of FIG. 1 in an embodiment of the invention.
Figure 7B:
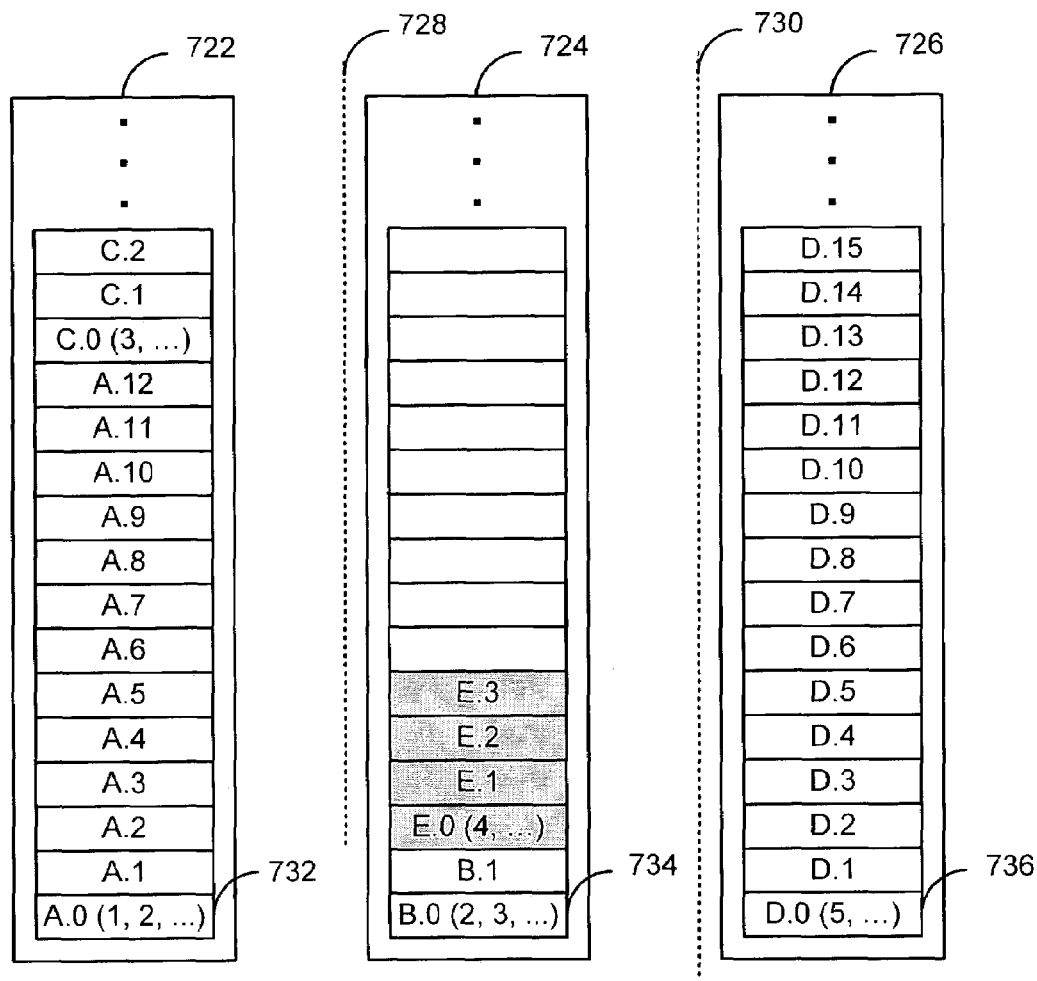
Figure 7C:
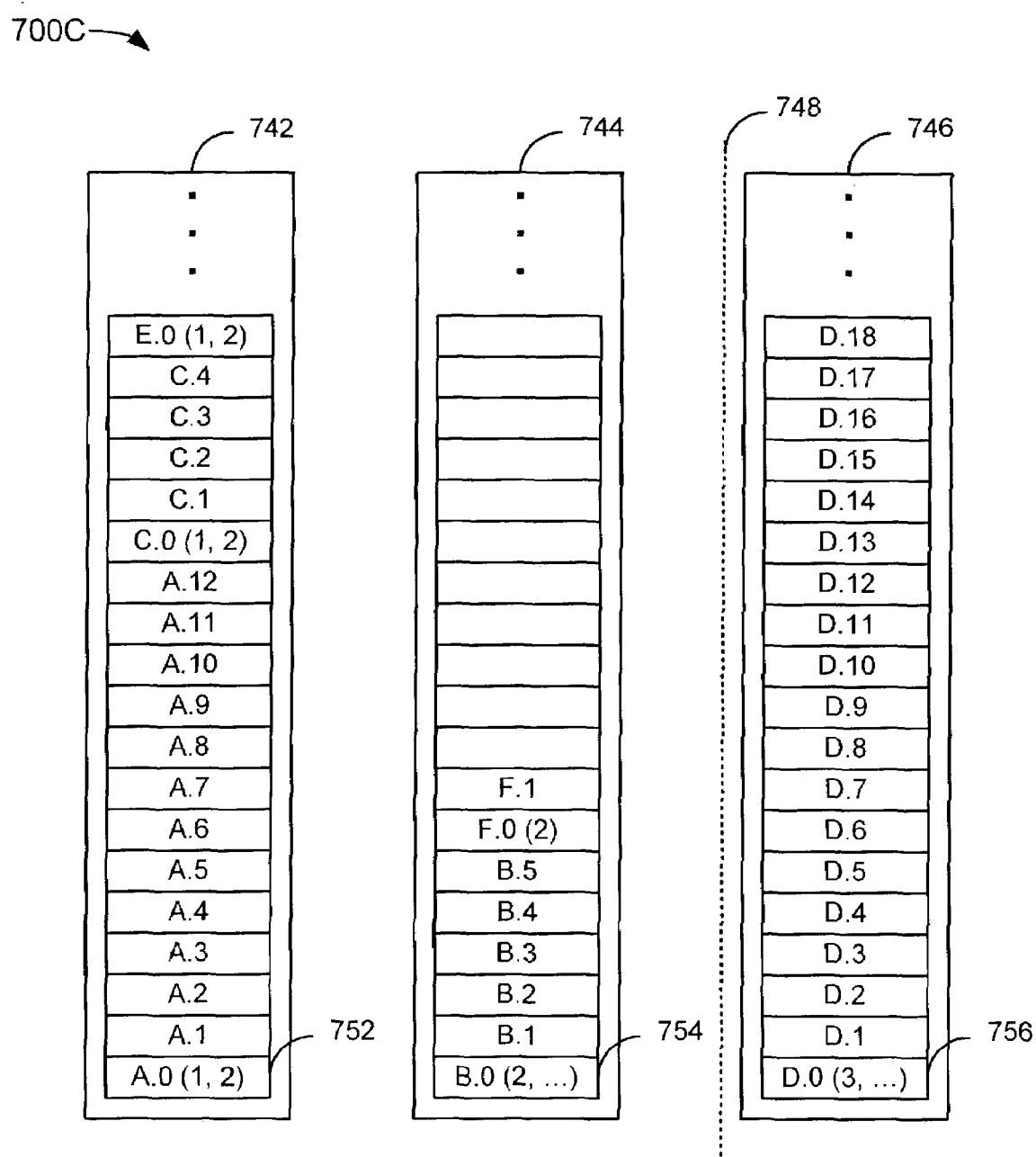

FIGS. 7A-7C are block diagrams of exemplary ingress queues 700A, 700B, and 700C for use with the system 100 of FIG. 1 in an embodiment of the invention. Tables 1, 2, and 3, below, are used with reference to FIGS. 7A, 7B, and 7C, respectively, to help illustrate distributing, or striping, packets across switching fabrics at an ingress.

The exemplary ingress queues 700A include unicast ingress queues 702, 704, and 706. Cells are forwarded from the head of the queues at head positions 712, 714, and 716, respectively. The unicast ingress queue 702 contains a packet A, broken into 13 cells (A.0 to A.12) and a packet C, broken into at least 3 cells (C.0 to C.2). The unicast ingress queue 704 contains a packet B, broken into 2 cells (B.0 and B.1). The unicast ingress queue 704 will also contain a packet E, broken into 4 cells (E.0 to E.3), at time t5, as described below. The unicast ingress queue 706 contains a packet D, broken into at least 16 cells (D.0 to D.15). In an embodiment, the unicast ingress queues 702, 704, and 706 have a 1:1 correspondence with their egress destinations. Therefore, the unicast ingress queues 702, 704, and 706 are not ordering interdependent. Accordingly, the mixing of cells from different queues is allowed. However, since packets from the same unicast queue will target the same egress destination, packets from the same queue should be forwarded in order. If a fabric is added or becomes incapacitated or disabled, the fabric is added to or skipped in the striping sequence (even at start). In order to communicate the starting fabric position of unicast queues to egresses, the ingress sends a fabric synchronization cell across all working fabrics to each egress unicast queue after reset or as requested by software.

Table 1: Unicast Cells Forwarded on HSIs illustrates which cells are forwarded in this example at times t0 to t5. At time t0, a cell-forwarding engine (e.g., the cell-forwarding engine 410 of FIG. 4) arbitrates between ingress queues with cells to forward. For the purposes of this example, unicast ingress queues 702, 704, and 706 are the only contending queues. The ingress queue that wins arbitration forwards cells on an HSI to a switching fabric that is associated with the HSI. Only one HSI is available for arbitration at a time although data transmission across HSIs may overlap. For the purposes of this example, four HSIs (HSI0 to HSI3) are used. An ingress queue should only win arbitration if it targets the HSI available for arbitration. For the purposes of this example, each of the unicast ingress queues 702, 704, and 706 initially target HSI 0. Assume that the active HSI is HSI 0 at time t0 and that unicast ingress queue 702 wins the arbitration. The unicast ingress queue 702 is permitted to forward the cell A.0 in the head position 712. When A.0 is forwarded, the head position 712 is adjusted to identify the next cell, A.1, the active HSI is incremented to HSI 1, and the unicast ingress queue 702 targets HSI 1. At this point, the active HSI is HSI 1. The unicast ingress queue 702 is the only contending queue that targets HSI 1. (The unicast ingress queues 704 and 706 were assumed to initially target HSI 0.) Accordingly, the unicast ingress queue 702 wins arbitration and forwards cell A.1 on HSI 1. Then, the head position 712 points to the next cell, A.2, the active HSI is incremented to HSI 2, and unicast ingress queue 702 targets HSI 2. Again, the unicast ingress queue 702 wins arbitration and forwards cell A.2. The head position 712 points to the next cell, A.3, the active HSI is incremented to HSI 3, and the unicast ingress queue 702 targets HSI 3. Once again, unicast ingress queue 702 wins arbitration and forwards cell A.3. The head position 712 points to the next cell, A.4, the active HSI is incremented to HSI 0 (since HSI 3 is the last HSI, the increment returns to the first HSI), and the unicast ingress queue 702 targets HSI 0. And all of the contending queues target HSI 0 once more.

At time t1, it is assumed that the unicast ingress queue 702 wins arbitration and forwards cell A.4. The head position 712 points to the next cell, A.5, the active HSI is incremented to HSI 1, and the unicast ingress queue 702 targets HSI 1. The unicast ingress queue 702 is the only contending queue that targets HSI 1. Accordingly, the unicast ingress queue 702 wins arbitration and forwards cell A.5 on HSI 1. Then, the head position 712 points to the next cell, A.6, the active HSI is incremented to HSI 2, and unicast ingress queue 702 targets HSI 2. Again, the unicast ingress queue 702 wins arbitration and forwards cell A.6. The head position 712 points to the next cell, A.7, the active HSI is incremented to HSI 3, and the unicast ingress queue 702 targets HSI 3. Once again, unicast ingress queue 702 wins arbitration and forwards cell A.7. The head position 712 points to the next cell, A.8, the active HSI is incremented to HSI 0, and the unicast ingress queue 702 targets HSI 0. And all of the contending queues target HSI 0 once more.

At time t2, it is assumed that the unicast ingress queue 704 wins arbitration and forwards cell B.0. The head position 714 points to the next cell, B.1, the active HSI is incremented to HSI 1, and the unicast ingress queue 704 targets HSI 1. The unicast ingress queue 704 is the only queue that targets HSI 1. Accordingly, the unicast ingress queue 704 wins arbitration and forwards cell B.1 on HSI 1. It is assumed that packet E has not yet been enqueued in the unicast ingress queue 704. Accordingly, the head position 714 does not point to E.0. In any case, the active HSI is incremented to HSI 2, and unicast ingress queue 704 targets HSI 2. Since the unicast ingress queue 704 does not currently have any cells to forward, the unicast ingress queue 704 should not win arbitration. Moreover, neither of the other contending unicast ingress queues 702 and 706 currently target HSI 2. Accordingly, HSI 2 is idle. The active HSI is incremented to HSI 3 and HSI 3 is idle for similar reasons. Then the active HSI is incremented to HSI 0, which is targeted by the unicast ingress queues 702 and 706.

At time t3, it is assumed that the unicast ingress queue 706 wins arbitration over the contending unicast ingress queue 702 and forwards cell D.0. The head position 716 points to the next cell, D.1, the active HSI is incremented to HSI 1, and the unicast ingress queue 706 targets HSI 1. The unicast ingress queue 706 is the only queue that targets HSI 1. Accordingly, the unicast ingress queue 706 wins arbitration and forwards cell D.1 on HSI 1. Then, the head position 716 points to the next cell, D.2, the active HSI is incremented to HSI 2, and unicast ingress queue 706 targets HSI 2. It is assumed that the unicast ingress queue 704 is not yet a contending queue because it is empty, even though the unicast ingress queue 704 targets HSI 2. Accordingly, the unicast ingress queue 706 wins arbitration and forwards cell D.2. The head position 716 points to the next cell, D.3, the active HSI is incremented to HSI 3, and the unicast ingress queue 706 targets HSI 3. Once again, unicast ingress queue 706 wins arbitration and forwards cell D.3. The head position 716 points to the next cell, D.4, the active HSI is incremented to HSI 0, and the unicast ingress queue 706 targets HSI 0.

At time t4, it is assumed that the unicast ingress queue 702 wins arbitration over the contending unicast ingress queue 706 and forwards cell A.8. The head position 712 points to the next cell, A.9, the active HSI is incremented to HSI 1, and the unicast ingress queue 702 targets HSI 1. The unicast ingress queue 702 is the only queue that targets HSI 1. Accordingly, the unicast ingress queue 702 wins arbitration and forwards cell A.9 on HSI 1. Then, the head position 712 points to the next cell, A.10, the active HSI is incremented to HSI 2, and unicast ingress queue 702 targets HSI 2. Again, the unicast ingress queue 702 wins arbitration and forwards cell A.10. The head position 712 points to the next cell, A.11, the active HSI is incremented to HSI 3, and the unicast ingress queue 702 targets HSI 3. Once again, unicast ingress queue 702 wins arbitration and forwards cell A.11. The head position 712 points to the next cell, A.12, the active HSI is incremented to HSI 0, and the unicast ingress queue 702 targets HSI 0.

At time t5, it is assumed that cells for packet E are now enqueued in the unicast ingress queue 704. It is assumed that the unicast ingress queue 702 wins arbitration over the contending unicast ingress queue 706 and forwards cell A.12. The head position 712 points to the next cell, C.0, the active HSI is incremented to HSI 1, and the unicast ingress queue 702 targets HSI 1. In an embodiment, the cells of a first packet (e.g., packet A) are treated no differently than the cells of a second packet (e.g., packet C) for the purposes of cell forwarding. Accordingly, the unicast ingress queue 702 wins arbitration and forwards cell C.0 on HSI 1. Then, the head position 712 points to the next cell, C.1, the active HSI is incremented to HSI 2, and unicast ingress queue 702 targets HSI 2. This time, it is assumed that the unicast ingress queue 704 wins arbitration over the unicast ingress queue 702, both of which target HSI 2. Accordingly, the unicast ingress queue 704 forwards cell E.0. The head position 714 points to the next cell, E.1, the active HSI is incremented to HSI 3, and the unicast ingress queue 704 targets HSI 3. Once again, unicast ingress queue 704 wins arbitration and forwards cell E.1. The head position 714 points to the next cell, E.2, the active HSI is incremented to HSI 0, and the unicast ingress queue 704 targets HSI 0.

TABLE 1

Unicast Cells Forwarded on HSIs

| Time | HSI 0 | HSI 1 | HSI 2 | HSI 3 | Notes |
|------|-------|-------|-------|-------|-------|
| t0 | A.0 | A.1 | A.2 | A.3 | A starts |
| t1 | A.4 | A.5 | A.6 | A.7 | |
| t2 | B.0 | B.1 | IDLE | IDLE | B starts/ends |
| t3 | D.0 | D.1 | D.2 | D.3 | D starts |
| t4 | A.8 | A.9 | A.10 | A.11 | |
| t5 | A.12 | C.0 | E.0 | E.1 | A ends, C starts, E starts |

The exemplary ingress queues 700B include multicast ingress queues 722, 724, and 726. Cells are forwarded from the head of the queues at head positions 732, 734, and 736, respectively. The multicast ingress queue 722 contains a packet A, broken into 13 cells (A.0 to A.12) with a CEP that includes egresses 1 and 2 and a packet C, broken into at least 3 cells (C.0 to C.2) with a CEP that includes egress 3. The CEP of the packets is indicated in FIG. 7B as parenthesis with numbers following the first cell of a packet (e.g., A.0 (1, 2)). The multicast ingress queue 724 contains a packet B, broken into 2 cells (B.0 and B.1) with a CEP that includes egresses 2 and 3. The multicast ingress queue 724 will also contain a packet E, broken into 4 cells (E.0 to E.3) with a CEP that includes egress 4, until time t7, as described below. For this example, all the packets are assumed to be at the same priority. The multicast ingress queue 726 contains a packet D, broken into at least 16 cells (D.0 to D.15) with a CEP that includes egress 5. Packets from multicast queues may target a plurality of egress destinations simultaneously and the CEP designations of packets within the same queue may be different. Accordingly, the intermixing of cells from different queues should only be allowed when the CEPs of cells at the same priority in the different queues do not overlap (i.e., the cells do not target the same egress queue). The partition 728 illustrates that the CEP of packet E does not overlap the CEP of packets A and C. The partition 730 illustrates that the CEP of packet D does not overlap the CEP of any of the other packets A, B, C, or E. It should be noted that in an alternative embodiment, cells of different packets from the same queue are intermixed if those packets do not have overlapping CEPs. If a fabric is added or becomes incapacitated or disabled, the fabric is added or skipped in the striping sequence (even at start). In order to communicate the starting fabric position of multicast queues to egresses, the ingress sends a fabric synchronization cell across all working fabrics to each egress multicast queue after reset, any time the starting fabric position is changed, or as requested by software.

In an embodiment, the egress has separate reassembly queues for multicast cells and unicast cells received from each ingress. Accordingly, unicast ingress queues with CEPs that overlap multicast ingress queue CEPs are not treated as overlapping for the purposes of arbitration. In another embodiment, the egress has separate reassembly queues for cells of different priorities received from each ingress. Accordingly, ingress queues with CEPs that overlap are not treated as overlapping for the purposes of arbitration if packets from the ingress queues have different priorities.

Table 2: Multicast Cells Forwarded on HSIs illustrates which cells are forwarded in this example at times t0 to t7. At time t0, a cell-forwarding engine (e.g., the cell forwarding engine 410 of FIG. 4) arbitrates between ingress queues with cells to forward. For the purposes of this example, multicast ingress queues 722, 724, and 726 are the only contending queues. The ingress queue that wins arbitration forwards cells on an HSI to a switching fabric that is associated with the HSI. Only one HSI is available for arbitration at a time although data transmission across HSIs may overlap. For the purposes of this example, four HSIs (HSI0 to HSI3) are used. An ingress queue should only win arbitration if the ingress queue targets the HSI that is available for arbitration. For the purposes of this example, each of the multicast ingress queues 722, 724, and 726 initially target HSI 0. The multicast ingress queues 722, 724, and 726 may be reprogrammed to have a starting target of any of the HSIs. A programmable starting position is better than a static starting position because different ingresses can be assigned different programmable starting positions to more evenly distribute traffic across HSIs for more even fabric loading. In an embodiment with four HSIs, ¼ of the ingresses could be programmed to have a starting position at each HSI such that the total number of ingresses with a starting position of a given HSI is approximately the same as the total number of ingresses with a starting position of any other HSI. Assume that the active HSI is HSI 0 at time t0 and that multicast ingress queue 722 wins the arbitration. The multicast ingress queue 722 is permitted to forward the cell A.0 in the head position 732. When A.0 is forwarded, the head position 732 points to A.1, the active HSI is incremented to HSI 1, and the multicast ingress queue 722 targets HSI 1. In this example, the multicast ingress queue 722 is allowed to send cells until the HSI is incremented back to the starting position, or HSI 0 in this case. Accordingly, the unicast ingress queue 722 forwards cell A.1 on HSI 1, A.2 on HSI 2, and A.3 on HSI 3. After each cell is forwarded, the active HSI is incremented and the multicast ingress queue 722 targets the active HSI. Eventually all of the contending queues target HSI 0 once more. Since A.0, the first cell of packet A, has been sent, but A.12, the last cell of packet A, has not been sent, the multicast ingress queue 722 is referred to as active. If an ingress queue is active, cells with CEPs that overlap the CEP of the packet being sent from the active queue may be excluded during arbitration. In general, each time an ingress queue completes sending a packet to the switching fabrics via the HSIs, instead of incrementing its target HSI to the next available HSI, it increments it to its programmed starting position instead. This aids in giving the egress a deterministic pattern for packet reassembly. Consider, if a multicast packet Q was sent by ingress A to egress B and a multicast packet R was sent by ingress A to egress C and the two packets ended on HSI x and HSI y, then the starting position of a multicast packet S being sent from ingress A to both egress B and egress C would be indeterminate.

At time t1, it is assumed that the multicast ingress queue 722 wins arbitration and forwards another 4 cells, A.4 to A.7. At time t2, it is assumed that the multicast ingress queue 726 wins arbitration and forwards cells D.0 to D.3. The multicast ingress queue 726 is now active. At time t3, it is assumed that the multicast ingress queue 722 wins arbitration again and forwards cells A.8 to A.11.

At time t4, it is assumed that the multicast ingress queue 722 wins arbitration and sends the last cell of packet A, A.12. Although the multicast ingress queue 722 has more cells, the cells belong to a different packet, packet C. In an embodiment, cells of packet C are not sent at time t4 because the CEP of packet C is not the same as the CEP of packet A. This may result in improperly synchronized ingress and egress queues.

At time t5, it is assumed that the multicast ingress queue 726 wins arbitration and forwards cells D.4 to D.7.

At time t6, it is assumed that the multicast ingress queue 724 wins arbitration and sends the two cells of packet B, B.0 and B.1. The cells of packet E are not enqueued in the multicast ingress queue 724 until time t7. And even if the multicast ingress queue 724 had more cells, the cells are not part of packet B. Accordingly, HSI 2 and HSI 3 are idle.

At time t7, it is assumed that the multicast ingress queue 724 wins arbitration and forwards cells E.0 to E.3.

TABLE 2

Multicast Cells Forwarded on HSIs

| Time | HSI 0 | HSI 1 | HSI 2 | HSI 3 | Notes |
|------|-------|-------|-------|-------|-------|
| t0 | A.0 | A.1 | A.2 | A.3 | A starts |
| t1 | A.4 | A.5 | A.6 | A.7 | |
| t2 | D.0 | D.1 | D.2 | D.3 | D starts |
| t3 | A.8 | A.9 | A.10 | A.11 | |
| t4 | A.12 | IDLE | IDLE | IDLE | A ends |
| t5 | D.4 | D.5 | D.6 | D.7 | |
| t6 | B.0 | B.1 | IDLE | IDLE | B starts/ends |
| t7 | E.0 | E.1 | E.2 | E.3 | E starts/ends |

The exemplary ingress queues 700C include multicast ingress queues 742, 744, and 746. Cells are forwarded from the head of the queues at head positions 752, 754, and 756, respectively. The multicast ingress queue 742 contains a packet A, broken into 13 cells (A.0 to A.12) with a CEP that includes only egresses 1 and 2, a packet C, broken into 5 cells (C.0 to C.4) with a CEP that includes only egresses 1 and 2, and a packet E is small enough to fit in a single cell (E.0) with a CEP that includes only egresses 1 and 2. The multicast ingress queue 744 contains a packet B, broken into 6 cells (B.0 to B.5) with a CEP that includes egress 2 and packet F, broken into 2 cells (F.0 and F.1) with a CEP that includes only egress 2. The multicast ingress queue 746 contains a packet D, broken into at least 19 cells (D.0 to D.18) with a CEP that includes egress 3. The partition 748 illustrates that the CEP of packet D does not overlap the CEP of any of the other packets A, B, C, E, or F. For the purposes of this example, all of the packets are assumed to be at the same priority.

Table 3: Multicast Cells Forwarded on HSIs using a Continuation Bit illustrates which cells are forwarded in this example at times t0 to t7. At time t0, a cell-forwarding engine (e.g., the cell forwarding engine 410 of FIG. 4) arbitrates between ingress queues with cells to forward. For the purposes of this example, multicast ingress queues 742, 744, and 746 are the only contending queues. For the purposes of this example, each of the multicast ingress queues 742, 744, and 746 initially target HSI 0. Assume that the active HSI is HSI 0 at time t0 and that multicast ingress queue 742 wins the arbitration. The multicast ingress queue 742 is permitted to forward the cell A.0 in the head position 752. When A.0 is forwarded, the head position points to A.1, the active HSI is incremented to HSI 1, and the multicast ingress queue 742 targets HSI 1. In this example, the multicast ingress queue 742 is allowed to send cells until the HSI is incremented back to HSI 0. Accordingly, the multicast ingress queue 742 forwards cell A.1 on HSI 1, A.2 on HSI 2, and A.3 on HSI 3. After each cell is forwarded, the active HSI is incremented and the multicast ingress queue 742 targets the active HSI. Eventually all of the contending queues target HSI 0 once more. The multicast ingress queue 742 is now active because packet A is in-flight. Since the CEPs of A and B overlap, the multicast ingress queue 744 will not win arbitration until A has been sent. Packet D has a CEP that does not include 1 or 2. Accordingly, since the destination lists of A and D do not overlap, the multicast ingress queue 746 could win arbitration before every cell of packet A has been sent.

At time t1, it is assumed that the multicast ingress queue 742 wins arbitration and forwards another 4 cells, A.4 to A.7. At time t2, it is assumed that the multicast ingress queue 746 wins arbitration and forwards cells D.0 to D.3. At time t3, it is assumed that the multicast ingress queue 742 wins arbitration-again and forwards cells A.8 to A.11.

At time t4, it is assumed that the multicast ingress queue 742 wins arbitration and sends the last cell of packet A, A.12. The next cell in the multicast ingress queue 742 is from packet C. The CEPs of packet A and packet C are identical. In an embodiment, the last cell of packet A, A.12, is marked with a continuation bit to indicate the next cell in the multicast ingress queue 742 is a continuation of A.12 if the CEPs are identical, even though the cells are from different packets. In other words, for the purposes of arbitration, packets A and C are treated as a single packet. Accordingly, cells C.0, C.1, and C.2 are sent at time t4, following cell A.12.

At time t5, it is assumed that the multicast ingress queue 746 wins arbitration and forwards cells D.4 to D.7.

At time t6, it is assumed that the multicast ingress queue 742 wins arbitration and sends cells C.3 and C.4. Since the destination list of C and E are identical, cell C.4 was marked with a continuation bit and the cell E.0 is sent at time t6, too. HSI 3 is idle because the multicast ingress queue 742 is empty. In an alternative, the continuation bit of cell E.0 is not set because it is the last cell in the multicast ingress queue 742. In another alternative, the continuation bit of the cell E.0 is not set in order to balance arbitration between ingress queues with overlapping CEPs even if the cell E.0 is not the last cell in the multicast ingress queue 742.

At time t7, it is assumed that the multicast ingress queue 744 wins arbitration and forwards cells B.0 to B.3.

At time t8, it is assumed that the multicast ingress queue 744 wins arbitration again and forwards cells B.4 and B.5. Since the destination list of F.0 is different from the destination list of B.5, B.5 is not marked with a continuation bit and HSI 2 and HSI 3 are idle.

TABLE 3

Multicast Cells Forwarded on HSIs using a Continuation Bit

| Time | HSI 0 | HSI 1 | HSI 2 | HSI 3 | Notes |
|------|-------|-------|-------|-------|-------|
| t0 | A.0 | A.1 | A.2 | A.3 | A starts |
| t1 | A.4 | A.5 | A.6 | A.7 | |
| t2 | D.0 | D.1 | D.2 | D.3 | D starts |
| t3 | A.8 | A.9 | A.10 | A.11 | |
| t4 | A.12 | C.O | C.1 | C.2 | A ends, C starts |
| t5 | D.4 | D.5 | D.6 | D.7 | |
| t6 | C.3 | C.4 | E.0 | IDLE | C ends, E starts/ends |
| t7 | B.0 | B.1 | B.2 | B.3 | B starts |
| t8 | B.4 | B.5 | IDLE | IDLE | B ends |

Figure 8A:
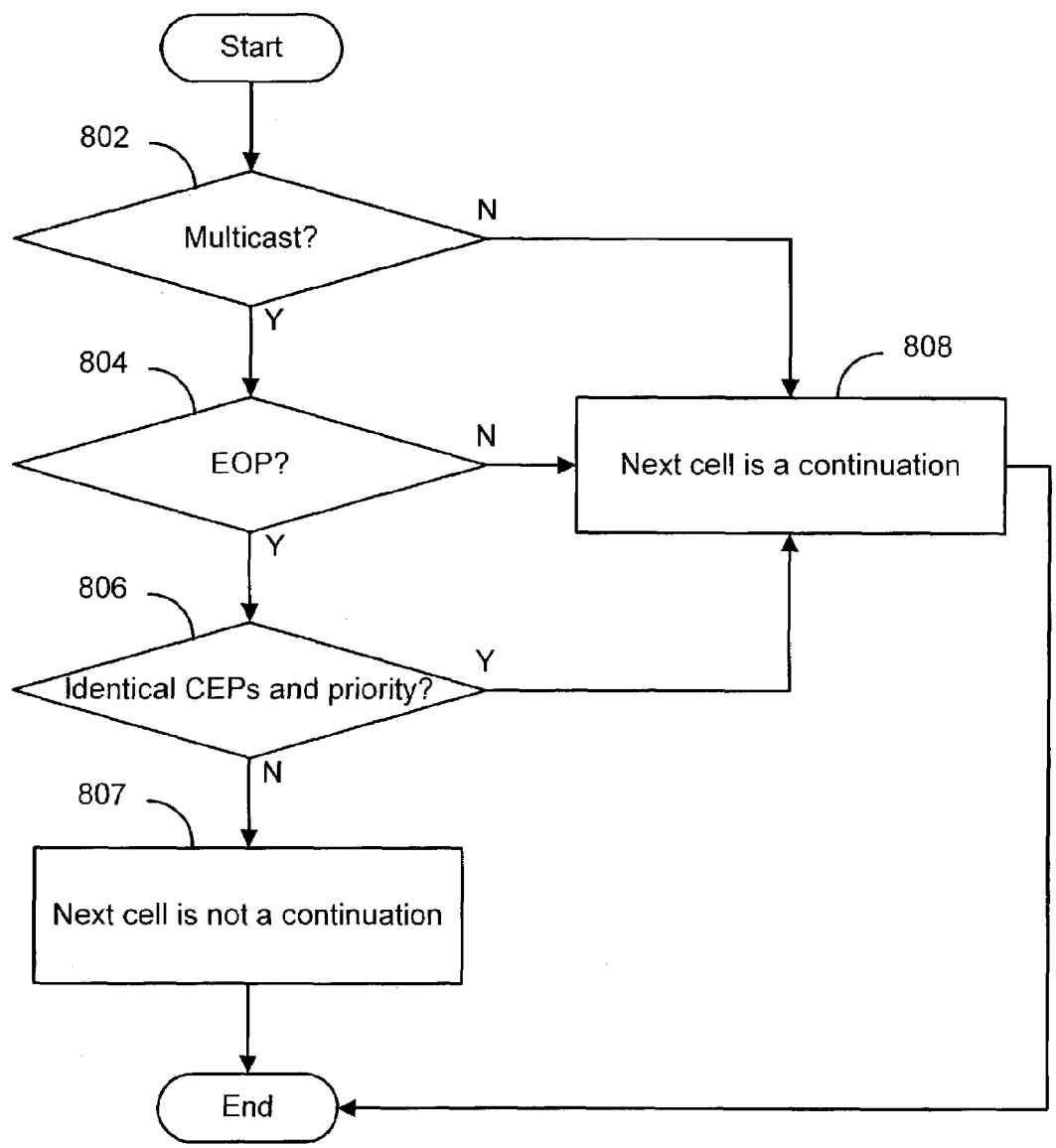
FIGS. 8A-8D are flowcharts of methods in accordance with embodiments of the invention.

FIG. 8A is a flowchart 800A of a method in accordance with an embodiment of the invention. Flowchart 800A is intended to illustrate the logical determination as to whether a next cell is a continuation of a first cell. The flowchart 800A starts at decision point 802 where it is determined whether the first cell is a multicast cell. If not, the first and next cells are unicast cells. A next unicast cell is treated as the continuation of a first unicast cell. Accordingly, if the first cell is not a multicast cell, the next cell is a continuation at step 808 and the flowchart 800A ends. If the first cell is a multicast cell, then it is determined whether the first cell is an EOP at decision point 804. If not, then the first and next cells include portions of the same packet. A next cell that contains a portion of the same packet is treated as the continuation of a first cell. Accordingly, if the first cell is not an EOP, the next cell is a continuation at step 808 and the flowchart 800A ends. If the first cell is an EOP, then it is determined whether the first cell and the next cell have identical CEPs and priorities at decision point 806. If so, the next cell is a continuation at step 808 and the flowchart 800A ends. If not, the next cell is not a continuation at step 807 and the flowchart 800A ends.

Figure 8B:
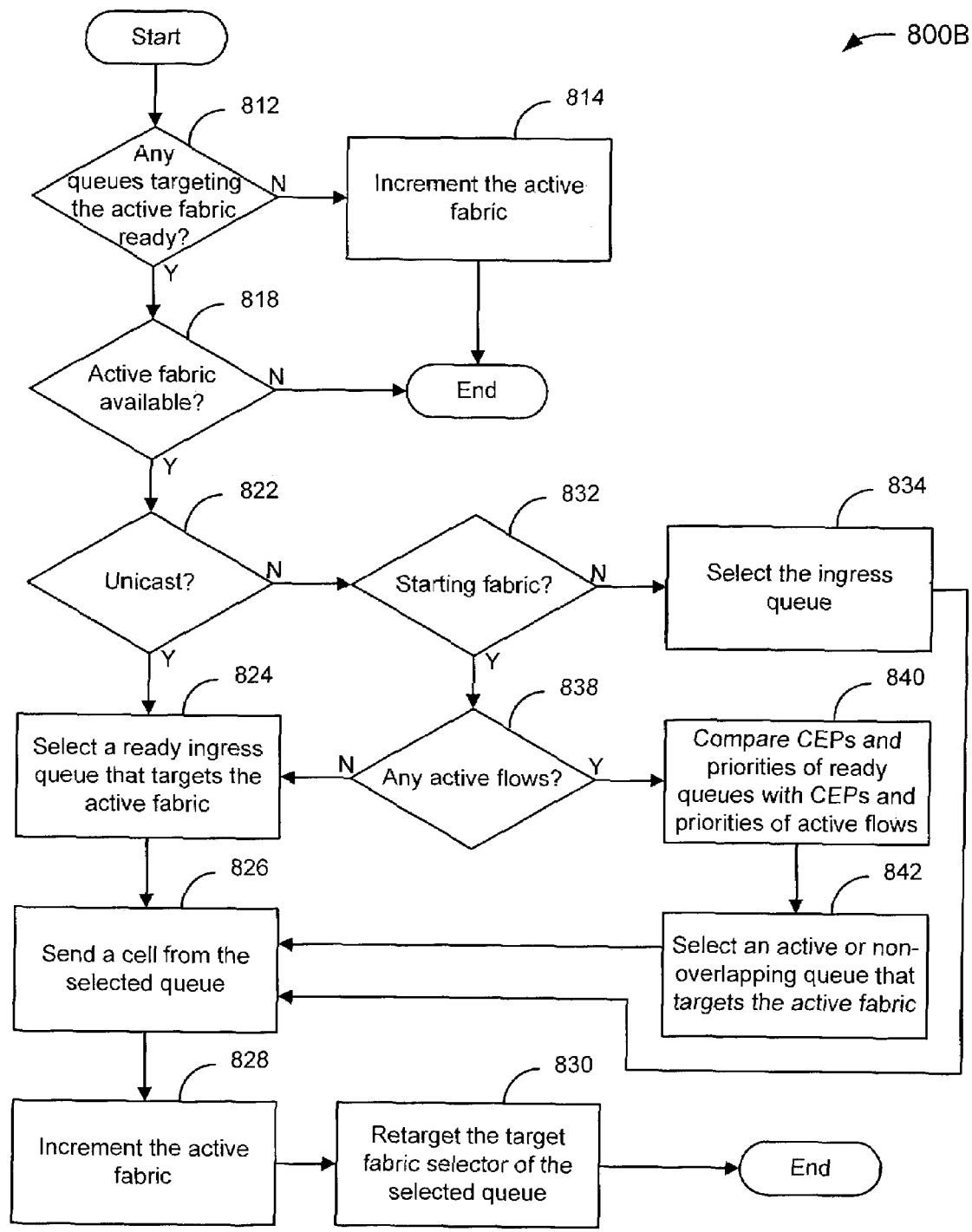

FIG. 8B is a flowchart 800B of a method in accordance with an embodiment of the invention. Flowchart 800B is intended to illustrate one cycle of a striping sequence at an ingress, whereby a cell is forwarded on one HSI of a plurality of HSIs. To load each HSI of the plurality of HSIs, the flowchart 800B is repeated for each HSI. At the start of flowchart 800B, it is assumed that each ingress queue targets a fabric with a target fabric selector and one of the fabrics is an active fabric. The flowchart 800B starts at decision point 812 where it is determined whether any ingress queues that target the active fabric are ready. An ingress queue is ready if it has a cell for forwarding. If not, the active fabric is incremented at step 814 and the flowchart 800B ends. Otherwise, if the active fabric is available, it is determined whether any queues targeting the active fabric are ready to send a cell at decision point 818. A fabric is available if it is possible to send data traffic across it. If a fabric is full, it is still considered available, but ingress queues that target the fabric are considered not ready until the fabric is no longer full. If not, the active fabric is incremented at step 814 and the flowchart 800B ends. If there are ready queues targeting the active fabric, then it is determined whether the ingress queue is a unicast ingress queue at decision point 822. If the ingress queue is unicast, then one of the ready ingress queues that currently targets the active fabric is selected in accordance with an arbitration algorithm at step 824, the cell is sent from the selected ingress queue at step 826, the active fabric is incremented at step 828, the selected ingress queue's target fabric selector is retargeted to the next available fabric at step 830, and the flowchart 800B ends. If the ingress queue is not unicast (i.e., the queue is multicast), then it is determined whether the active fabric is a starting fabric for multicast ingress queues at decision point 832. If not, then an ingress queue that is in the process of sending a multicast packet (or null cells) or an ingress queue whose current cell is a continuation cell (e.g., the cell that preceded it in the ingress queue had its continuation bit set) is selected at step 834 and it is determined whether the next cell of the selected queue is a continuation cell. If so, the current cell is sent from the selected queue at step 826, the selected queue's target fabric selector is retargeted to the next available fabric at step 830, the active fabric is incremented at step 828 and the flowchart 800B ends. If the next cell of the selected queue is not a continuation cell, then the current cell is sent from the selected queue at step 826, the selected queue's target fabric selector is retargeted to the programmed multicast starting fabric (or the first available fabric after the starting fabric if the starting fabric is unavailable) at step 830, the active fabric is incremented at step 828, and the flowchart 800B ends. If at decision point 832 it is determined that the active fabric is a multicast starting fabric, then it is determined whether there are any active flows at decision point 838. A flow is considered active if the last cell sent from that flow was not an EOP cell with the continuation bit cleared. If there are no active flows, then a ready ingress queue that targets the active fabric is selected at step 824 and the flowchart 800B continues as described previously. If there are active flows, then the CEPs and priorities of ready ingress queues are compared with the CEPs and priorities of the active flows at step 840, an active or non-overlapping ingress queue that targets the active fabric is selected at step 842, a cell is sent from the selected ingress queue at step 826, and the flowchart 800B continues as described previously.

Figure 8C:
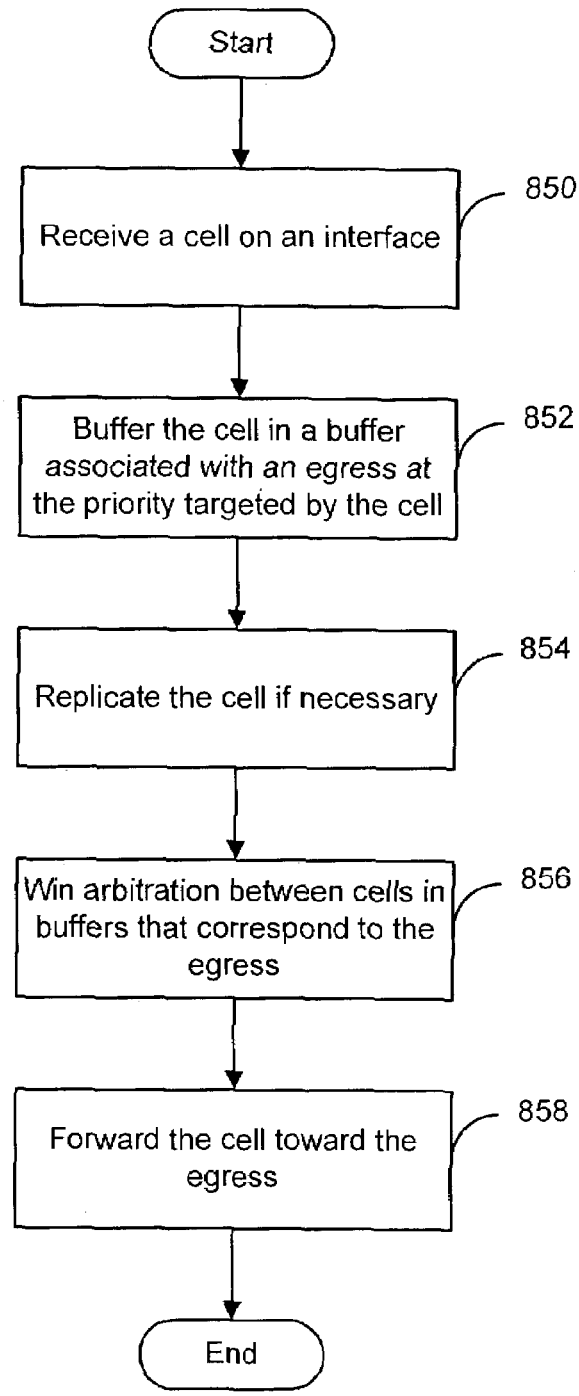

FIG. 8C is a flowchart 800C of a method in accordance with an embodiment of the invention. Flowchart 800C is intended to illustrate the forwarding of a cell through a switching fabric. It is assumed prior to the start of flowchart 800C that the cell targets an egress. The flowchart 800C starts with receiving the cell on an interface at step 850. The cell is buffered in a buffer that is associated with the egress at the priority targeted by the cell at step 852. The cell is replicated if necessary at step 854. Replication may be necessary for multicast cells. After winning arbitration between cells in buffers that are associated with the egress at step 856, the cell is forwarded toward the egress at step 858 and the flowchart 800C ends.

Figure 8D:
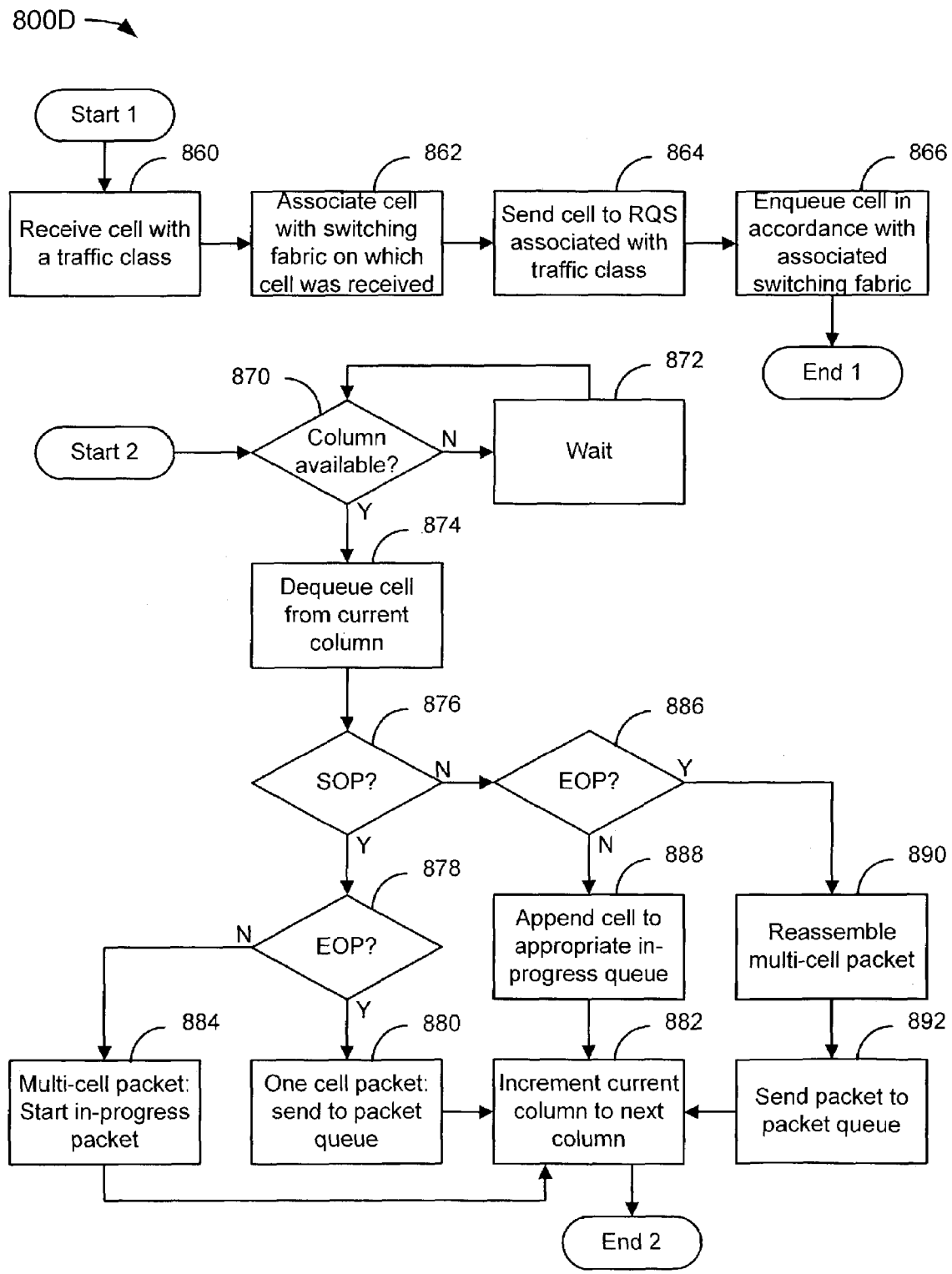

FIG. 8D is a flowchart 800D of a method in accordance with an embodiment of the invention. Flowchart 800D is intended to illustrate the enqueuing and dequeuing of cells in a RQS at an egress. Since dequeued cells are reassembled into packets, repetition of the flowchart 800D illustrates a method of reassembling cells into packets. The flowchart 800D starts at "start 1" with receiving a cell with a traffic class at step 860. The traffic class may include a priority, an IOE, or some other traffic data. The cell is associated with the switching fabric on which it was received at step 862. The cell is sent to a RQS associated with the traffic class of the cell at step 864. The cell is enqueued in accordance with the switching fabric associated with the cell at step 866. And the flowchart 800D ends at "end 1" after the cell is enqueued in the appropriate column of the RQS.

To dequeue a cell, the flowchart 800D starts after "start 2" at decision point 870 where it is determined whether a column is available for dequeueing. A column is available if a cell is at the head of the column at a first memory location and all preceding columns contain a cell at the first memory location or have already dequeued a cell from the first memory location or are not in use. If the column is not available, wait at step 872 until the column is available. Note that in some cases, error detection and recovery may be necessary to flush the queue and end the wait at step 872 (not shown). If the column is available, then the cell is dequeued at step 874 and it is determined at decision point 876 whether the cell is a SOP cell. If the cell is a SOP cell, then at decision point 878 it is determined whether the cell is an EOP cell. If the cell is both a SOP and an FOP cell, then the cell is a one-cell packet, which is sent to the packet queue at step 880. Then the current column is incremented to the next column at step 882 and the flowchart 800D ends. If the cell is a SOP, but not an FOP, then it is a multi-cell packet, which is sent to a in-progress queue to start an in-progress packet at step 884. Then the current column is incremented to the next column at step 882 and the flowchart 800D ends. If at decision point 876 it is determined that the cell is not a SOP cell, then at decision point 886 it is determined whether the cell is an FOP cell. If the cell is neither a SOP cell nor an FOP cell, the cell is appended to the appropriate in-progress queue at step 888. Then the column is incremented to the next column at step 882 and the flowchart 800D ends. If the cell is not a SOP cell, but is an FOP cell, then the associated multi-cell packet is reassembled using the cell at step 890 and the reassembled packet is sent to the packet queue at step 892. Then the column is incremented to the next column at step 882 and the flowchart 800D ends.

In one embodiment, the method steps described above are embodied in a computer-readable media as computer instruction code. It shall be appreciated that not all methods steps described must be performed, nor must they be performed in the order stated.

The term packet is defined broadly to include fixed-length cells, variable length packets, and encapsulated data. A packet could be broken into a plurality of smaller cells. As used herein, the term packet could refer to a flow of the plurality of cells or a single cell of such a flow.

Although specific embodiments of the invention have been described and illustrated, the invention is not to be limited to the specific forms or arrangements of parts as described and illustrated herein. The invention is limited only by the claims.

What is claimed is:

1. A method of load balancing across a plurality of switching fabrics, comprising:
   targeting a first fabric of a plurality of fabrics with respective target fabric selectors of one or more ingress queues of a plurality of ingress queues;
   establishing said first fabric as an active fabric;
   selecting a first ingress queue of said one or more ingress queues to send a first cell to said active fabric if said first fabric is a starting fabric of said first ingress queue, wherein said starting fabric is a fabric that is initially targeted by the respective target fabric selector of said first ingress queue;
   sending said first cell if said first fabric is said starting fabric of said first ingress queue;
   incrementing said active fabric to a second fabric of said plurality of fabrics; and
   retargeting said active fabric with said first ingress queue if said first cell was sent.

2. The method of claim 1, wherein said first fabric is not said starting fabric for said first ingress queue, further comprising:
   selecting said first ingress queue to send said first cell to said active fabric if said first ingress queue is unicast; and
   sending said first cell if said first ingress queue is unicast.

3. The method of claim 1, wherein said first fabric is said starting fabric for each of said one or more ingress queues and wherein said selecting further comprises:
   determining that there are one or more active multicast ingress queues;
   comparing a first channel exit port list (CEP) associated with said first ingress queue to one or more CEPs associated with said one or more active multicast ingress queues to determine said first ingress queue does not overlap; and
   arbitrating between said first ingress queue and said one or more active multicast ingress queues.

4. The method of claim 1, wherein said first fabric is not said starting fabric for said first ingress queue, further comprising:
   sending a second cell from said first ingress queue to said active fabric;
   selecting said first ingress queue to send said first cell to said active fabric if said first cell is a continuation of said second cell;
   sending said first cell if said first cell is a continuation of said second cell; and
   retargeting said first fabric with said first ingress queue if said first cell was not sent.

5. The method of claim 4, further comprising:
   determining that said second cell is an end-of-packet (EOP);
   comparing a first channel exit port list (CEP) associated with said first cell to a second CEP associated with said second cell to determine that said first CEP and said second CEP are identical; and
   setting a continuation indicator associated with said second cell.

6. The method of claim 1, wherein a third fabric is unavailable, said incrementing further comprising:
   reacting to the unavailability of a third fabric by skipping said third fabric.

7. The method of claim 6, wherein a fourth fabric becomes available, said incrementing further comprising:
   reacting to the availability of said fourth fabric by incrementing to said fourth fabric.

8. The method of claim 1, further comprising:
   communicating said starting fabric to an egress queue; and
   synchronizing said egress queue to said first ingress queue in accordance with said starting fabric.

9. The method of claim 8, further comprising:
   selecting a new starting fabric if said starting fabric is unavailable;
   communicating said new starting fabric to said egress queue; and
   synchronizing said egress queue to said first ingress queue in accordance with said new starting fabric.

10. The method of claim 9, further comprising:
    selecting a new starting fabric if said starting fabric is unavailable;
    communicating said new starting fabric to said plurality of egress queues; and
    synchronizing said plurality of egress queues to said plurality of ingress queues in accordance with said new starting fabric.

11. The method of claim 8, further comprising:
    assigning said starting fabric to each multicast ingress queue of said plurality of ingress queues;
    communicating said starting fabric to a plurality of egress queues; and
    synchronizing said egress queues to said plurality of ingress queues in accordance with said starting fabric.

12. The method of claim 1, wherein said second fabric is a first available fabric after said first fabric.

13. A system for performing load balancing across a plurality of switching fabrics, comprising:
    an active fabric pointer configured to recognize a first fabric of a plurality of independent switching fabric modules as an active fabric of said plurality of independent switching fabric modules;

an ingress, coupled to each of said plurality of independent switching fabric modules via respective ingress high speed interfaces (HSIs), including a plurality of ingress queues;

a plurality of target fabric selectors respectively associated with said plurality of ingress queues, wherein each target fabric selector is configured to identify one of said plurality of independent switching fabric modules; and a cell forwarding engine configured to:
  select an ingress queue of said plurality of ingress queues in accordance with an arbitration algorithm if said ingress queue has an associated target fabric selector that identifies said active fabric;
  send a first cell from said selected ingress queue;
  adjust said active fabric pointer in accordance with an active fabric incrementing algorithm such that said active fabric pointer recognizes a second fabric as said active fabric; and
  adjust said associated target fabric selector to identify said active fabric.

14. The system of claim 13, wherein a second cell follows a first cell in an ingress queue, further comprising:
a continuation designator configured to:
  determine whether a first cell is an end-of-packet (EOP);
  compare a first channel exit port list (CEP) associated with said first cell to a second CEP associated with a second cell to determine that said first CEP and said second CEP are identical; and
  set a continuation indicator associated with said first cell.

15. The system of claim 13, wherein said ingress queue is a multicast ingress queue, further comprising:
an arbitration engine for implementing said arbitration algorithm, configured to:
  determine whether there are active multicast ingress queues, wherein a first multicast ingress queue is active if said first multicast ingress queue contains a cell that is a continuation of a cell that was previously sent and wherein a second multicast ingress queue is inactive if said second multicast ingress queue contains no cells that are continuations of a cell that was previously sent;
  compare channel exit port lists (CEPs) associated with said active multicast ingress queues to CEPs associated with contending multicast ingress queues if there are active multicast ingress queues;
  eliminate a subset of contending multicast ingress queues from arbitration if said compare indicates the CEPs associated with said subset overlap said CEPs associated with said active multicast ingress queues; and
  arbitrate between said active multicast ingress queues and non-overlapping inactive multicast ingress queues.

16. The system of claim 13, further comprising:
a last fabric used marker that is updated by said active fabric pointer, wherein a target fabric selector of said plurality of target fabric selectors is further configured to retarget a third fabric of said plurality of independent switching fabrics, if said third fabric changes status from available to unavailable or from unavailable to available, wherein the third fabric is a first available fabric after a fabric specified in the last fabric used marker.

17. The system of claim 13, further comprising:
an egress, coupled to each of a plurality of independent switching fabric modules via respective egress HSIs, including:

a packet memory;
a receive interface configured to:
  receive cells from said independent switching fabric modules; and
  receive synchronization cells from an ingress module;
a plurality of reassembly queues configured to contain cells that are received from respective ingress queues, wherein said plurality of reassembly queues are logically divided into reassembly queue sets (RQSs) that contain one reassembly queue per independent switching fabric module;
a reassembly engine configured to:
  initialize each RQS to a starting position using said synchronization cells;
  associate a first subplurality of said cells that are received from a first respective ingress queue with a first row of a first RQS;
  associate said first subplurality of cells with respective reassembly queues of said first RQS; and
  reassemble said first subplurality of cells into one or more packet segments;
in-progress buffers configured to contain said one or more packet segments as packets are assembled from said received cells;
a random early drop (RED) block configured to mark packets in accordance with a RED algorithm;
a plurality of packet queues configured to contain said packets; and
a transmit interface configured to send packets from said packet memory if said packets are contained in one of said packet queues.

18. A packet forwarding device, comprising:
one or more ingresses, wherein each ingress includes:
  a plurality of unicast ingress queues;
  a plurality of multicast ingress queues; and
  a plurality of target fabric selectors respectively associated with said unicast and multicast ingress queues;
a plurality of switching fabrics respectively coupled to each of said one or more ingresses by high speed interfaces (HSIs), wherein each switching fabric includes a plurality of buffers that correspond to said unicast ingress queues, and wherein each target fabric selector is configured to identify one of said plurality of switching fabrics; and
one or more egresses respectively coupled to each of said plurality of switching fabrics by HSIs, wherein each egress includes a plurality of unicast egress queues that correspond to said unicast ingress queues, and a plurality of multicast egress queues that correspond to said multicast ingress queues.

19. The packet forwarding device of claim 18, further comprising:
a synchronization module, associated with an ingress of said one or more ingresses, configured to:
  detect unavailable switching fabrics; and
  synchronize said ingress with an egress of said one or more egresses.

20. The packet forwarding device of claim 18, further comprising:
a synchronization module, associated with an egress of said one or more egresses, configured to:
  detect unavailable switching fabrics; and
  synchronize said egress with an ingress of said one or more ingresses.

* * * * *